US012717203B2

(12) United States Patent
Cheng et al.

(10) Patent No.: US 12,717,203 B2
(45) Date of Patent: Aug. 25, 2026

(54) DISPLAY SUBSTRATE, MANUFACTURING METHOD THEREOF, INTERMEDIATE SUBSTRATE, AND ELECTRONIC PAPER DISPLAY APPARATUS

(71) Applicants: Fuzhou BOE Optoelectronics Technology Co., Ltd., Fuzhou (CN); BOE Technology Group Co., Ltd., Beijing (CN)

(72) Inventors: Hao Cheng, Beijing (CN); Yanfei Chi, Beijing (CN); Chengjun Liu, Beijing (CN); Jiantao Lin, Beijing (CN); Linlin Lin, Beijing (CN); Yao Liu, Beijing (CN); Zuwen Liu, Beijing (CN); Changhong Shi, Beijing (CN); Jin Wang, Beijing (CN)

(73) Assignees: FUZHOU BOE OPTOELECTRONICS TECHNOLOGY CO., LTD., Fuzhou (CN); BOE TECHNOLOGY GROUP CO., LTD., Beijing (CN)

( * ) Notice: Subject to any disclaimer, the term of this patent is extended or adjusted under 35 U.S.C. 154(b) by 294 days.

(21) Appl. No.: 18/291,692

(22) PCT Filed: Aug. 1, 2022

(86) PCT No.: PCT/CN2022/109500

§ 371 (c)(1),
(2) Date: Jan. 24, 2024

(87) PCT Pub. No.: WO2024/026634

PCT Pub. Date: Feb. 8, 2024

(65) Prior Publication Data

US 2025/0093730 A1 Mar. 20, 2025

(51) Int. Cl.
*G02F 1/1676* (2019.01)
*G02F 1/1368* (2006.01)
*G02F 1/167* (2019.01)

(52) U.S. Cl.
CPC .......... *G02F 1/1676* (2019.01); *G02F 1/1368* (2013.01); *G02F 1/167* (2013.01)

(58) Field of Classification Search
CPC ...... G02F 1/1676; G02F 1/1368; G02F 1/167; G02F 1/1345; G02F 1/136204; G02F 1/1309
See application file for complete search history.

(56) References Cited

U.S. PATENT DOCUMENTS

2016/0293077 A1 10/2016 Ma
2017/0031191 A1 2/2017 Choi et al.

FOREIGN PATENT DOCUMENTS

CN 103676345 A 3/2014
CN 105070712 A 11/2015
(Continued)

OTHER PUBLICATIONS

CN 114241960 A machine translation (Year: 2022).*
CN 112530937 A machine translation (Year: 2020).*

*Primary Examiner* — James A Dudek
(74) *Attorney, Agent, or Firm* — Nath, Goldberg & Meyer; Joshua B. Goldberg

(57) ABSTRACT

The present disclosure provides a display substrate, a manufacturing method thereof, an intermediate substrate and an electronic paper display apparatus. The display substrate includes: a base substrate including a display region and a bezel region on at least one side of the display region; a plurality of test sub-terminals in the bezel region, including a common voltage test sub-terminal and a plurality of non-common voltage test sub-terminals; and a first electro-
(Continued)

static ring in the bezel region, through which the plurality of non-common voltage test sub-terminals are arranged in series and/or grounded.

18 Claims, 12 Drawing Sheets

(56) References Cited

FOREIGN PATENT DOCUMENTS

| | | | |
|---|---|---|---|
| CN | 110286513 | A | 9/2019 |
| CN | 112530937 | A | 3/2021 |
| CN | 113811938 | A | 12/2021 |
| CN | 114023736 | A | 2/2022 |
| CN | 114241960 | A | 3/2022 |
| KR | 20100022438 | A | 3/2010 |
| WO | 2018205626 | A1 | 11/2018 |
| WO | 2022087861 | A1 | 5/2022 |

* cited by examiner

DISPLAY SUBSTRATE, MANUFACTURING METHOD THEREOF, INTERMEDIATE SUBSTRATE, AND ELECTRONIC PAPER DISPLAY APPARATUS

This is a National Phase Application filed under 35 U.S.C. 371 as a national stage of PCT/CN2022/109500, filed Aug. 1, 2022, the content of which is hereby incorporated by reference in its entirety.

TECHNICAL FIELD

The present disclosure relates to the field of display technology, and particularly relates to a display substrate, a manufacturing method thereof, an intermediate substrate and an electronic paper display apparatus.

BACKGROUND

The electronic paper display (EPD) product is a common electronic price tag and electronic reader product in the current market. The EPD has a display effect close to real paper, can display for a long time after being refreshed once, and has the advantages of environmental protection, energy conservation and the like, and thus is in great market demand.

SUMMARY

The display substrate, the manufacturing method thereof, the intermediate substrate and the electronic paper display apparatus provided in the embodiments of the present disclosure specifically provide the following technical solutions:

In one aspect, an embodiment of the present disclosure provides a display substrate, including:

- a base substrate including a display region and a bezel region on at least one side of the display region;
- a plurality of test sub-terminals in the bezel region, including a common voltage test sub-terminal and a plurality of non-common voltage test sub-terminals; and
- a first electrostatic ring in the bezel region, through which the plurality of non-common voltage test sub-terminals are arranged in series and/or grounded.

In some embodiments, in the display substrate provided in the embodiments of the present disclosure, the first electrostatic ring is electrically connected between two adjacent non-common voltage test sub-terminals.

In some embodiments, the display substrate provided in the embodiments of the present disclosure further includes a second electrostatic ring electrically connected between the common voltage test sub-terminal and a non-common voltage test sub-terminal adjacent to the common voltage test sub-terminal; wherein

- the second electrostatic ring and the first electrostatic ring each include a plurality of transistors electrically connected to each other, and a transistor in the second electrostatic ring has a channel width-to-length ratio smaller than a transistor in the first electrostatic ring.

In some embodiments, in the display substrate provided in the embodiments of the present disclosure, the first electrostatic ring includes a first connection end and a second connection end;

- the first electrostatic ring includes four transistors, wherein a gate of a first transistor, a first electrode of the first transistor, and a first electrode of a second transistor are electrically connected together to serve as the first connection end; a second electrode of the first transistor, a second electrode of the second transistor, a gate of the second transistor, a gate of a third transistor, a first electrode of the third transistor, and a first electrode of a fourth transistor are electrically connected together; a gate of the fourth transistor, a second electrode of the fourth transistor, and a second electrode of the third transistor are electrically connected together to serve as the second connection end.

In some embodiments, the display substrate provided in the embodiments of the present disclosure further includes a transfer electrode above a layer where the first electrostatic ring is located, wherein the transfer electrode is electrically connected to the second electrode of the first transistor, the second electrode of the second transistor, the gate of the second transistor, the gate of the third transistor, the first electrode of the third transistor, and the first electrode of the fourth transistor.

In some embodiments, the display substrate provided in the embodiments of the present disclosure further includes a pixel electrode above a layer where the first electrostatic ring is located, wherein the transfer electrode and the pixel electrode are in the same layer and made of the same material.

In some embodiments, in the display substrate provided in the embodiments of the present disclosure, the plurality of transistors in the second electrostatic ring are electrically connected in the same manner as the plurality of transistors in the first electrostatic ring.

In some embodiments, the display substrate provided in the embodiments of the present disclosure further includes a plurality of first transfer terminals, each of which is electrically connected to one of the test sub-terminals.

In some embodiments, in the display substrate provided in the embodiments of the present disclosure, the first electrostatic ring is electrically connected to the non-common voltage test sub-terminals through the first transfer terminals.

In some embodiments, the display substrate provided in the embodiments of the present disclosure further includes a pixel electrode above a layer where the first electrostatic ring is located, wherein the plurality of first transfer terminals and the pixel electrode are in the same layer and made of the same material.

In some embodiments, the display substrate provided in the embodiments of the present disclosure further includes a ground line in the bezel region, wherein each of the non-common voltage test sub-terminals is electrically connected to the ground line through the first electrostatic ring.

In another aspect, an embodiment of the present disclosure provides an intermediate substrate, including a plurality of display substrates each being the display substrate provided in the above embodiments of the present disclosure.

In some embodiments, the intermediate substrate provided in the embodiments of the present disclosure further includes a plurality of test terminals and a third electrostatic ring on a side of a region where the plurality of display substrates are located, wherein the plurality of test terminals include a common voltage test terminal and a non-common voltage test terminal, the common voltage test terminal is electrically connected to the common voltage test sub-terminal, the non-common voltage test terminal is electrically connected to one of the non-common voltage test sub-terminals, and the third electrostatic ring is electrically connected between the common voltage test terminal and the non-common voltage test terminal.

In some embodiments, in the intermediate substrate provided in the embodiments of the present disclosure, a plurality of non-common voltage test terminals are provided, and at least two of the non-common voltage test sub-terminals are connected to the common voltage test terminal through the third electrostatic ring, respectively.

In some embodiments, in the intermediate substrate provided in the embodiments of the present disclosure, the third electrostatic ring has the same structure as the first electrostatic ring.

In some embodiments, in the intermediate substrate provided in the embodiments of the present disclosure, the plurality of test terminals and the plurality of test sub-terminals are each in the same layer and made of the same material as gates of the plurality of transistors.

In some embodiments, the intermediate substrate provided in the embodiments of the present disclosure further includes a plurality of first connection lines, a plurality of second connection lines, and a plurality of first transfer lines, wherein the plurality of first connection lines and the plurality of second connection lines are in the same layer and made of the same material, and the plurality of first connection lines are in in a layer different from a layer where the plurality of first transfer lines are located; and each of the first connection lines is electrically connected to a corresponding one of the test sub-terminals through one of the first transfer terminals, each of the second connection lines is electrically connected to one of the test terminals, and each of the first transfer lines is electrically connected between one of the first connection lines and one of the second connection lines.

In some embodiments, the intermediate substrate provided in the embodiments of the present disclosure further includes a plurality of second transfer lines, a plurality of third transfer lines, and one fourth transfer line, wherein each of the non-common voltage test terminals is electrically connected to a corresponding one of the second connection lines through one of the second transfer lines, each of the second transfer lines is electrically connected to one of the third transfer lines through the third electrostatic ring, the plurality of third transfer lines are electrically connected to the fourth transfer line, and the common voltage test terminal is electrically connected to a corresponding one of the second connection lines through the fourth transfer line.

In some embodiments, in the intermediate substrate provided in the embodiments of the present disclosure, the plurality of third transfer lines are integrally formed with the fourth transfer line.

In some embodiments, the intermediate substrate provided in the embodiments of the present disclosure further includes a fourth electrostatic ring, through which the plurality of third transfer lines are electrically connected to the fourth transfer line.

In some embodiments, in the intermediate substrate provided in the embodiments of the present disclosure, the fourth electrostatic ring has the same structure as the first electrostatic ring.

In some embodiments, the intermediate substrate provided in the embodiments of the present disclosure further includes a pixel electrode above a layer where the first electrostatic ring is located, wherein the first transfer lines, the second transfer lines, the third transfer lines, and the fourth transfer line are all in the same layer and made of the same material as the pixel electrode.

In some embodiments, the intermediate substrate provided in the embodiments of the present disclosure further includes a plurality of second transfer terminals, wherein each of the second transfer terminals is electrically connected to a corresponding one of the test terminals.

In some embodiments, the intermediate substrate provided in the embodiments of the present disclosure further includes a pixel electrode above a layer where the first electrostatic ring is located, wherein the plurality of second transfer terminals and the pixel electrode are in the same layer and made of the same material.

In some embodiments, the intermediate substrate provided in the embodiments of the present disclosure further includes a shorting bar and a plurality of high resistance lines, wherein the high resistance lines are located between the second transfer terminals, each of the high resistance lines is integrally formed with one of the second transfer terminals, each of the test terminals is electrically connected to the shorting bar via one of the high resistance lines, and the shorting bar is in floating.

In another aspect, an embodiment of the present disclosure provides a method for manufacturing a display substrate, including:

- providing the intermediate substrate according to any one of the above embodiments of the present disclosure; and
- cutting the intermediate substrate to obtain the display substrate, wherein the display substrate includes a base substrate including a display region and a bezel region on at least one side of the display region, the bezel region is provided with a plurality of test sub-terminals and a plurality of first electrostatic rings, the plurality of test sub-terminals include a common voltage test sub-terminal and a plurality of non-common voltage test sub-terminals, and the plurality of non-common voltage test sub-terminals are arranged in series and/or grounded via the first electrostatic rings.

In another aspect, an embodiment of the present disclosure provides an electronic paper display apparatus, including a display substrate and an opposite substrate opposite to each other, and an electrophoretic layer between the display substrate and the opposite substrate; wherein the display substrate is the display substrate provided in the above embodiments of the present disclosure.

REFERENCE SIGNS

Figure 1:
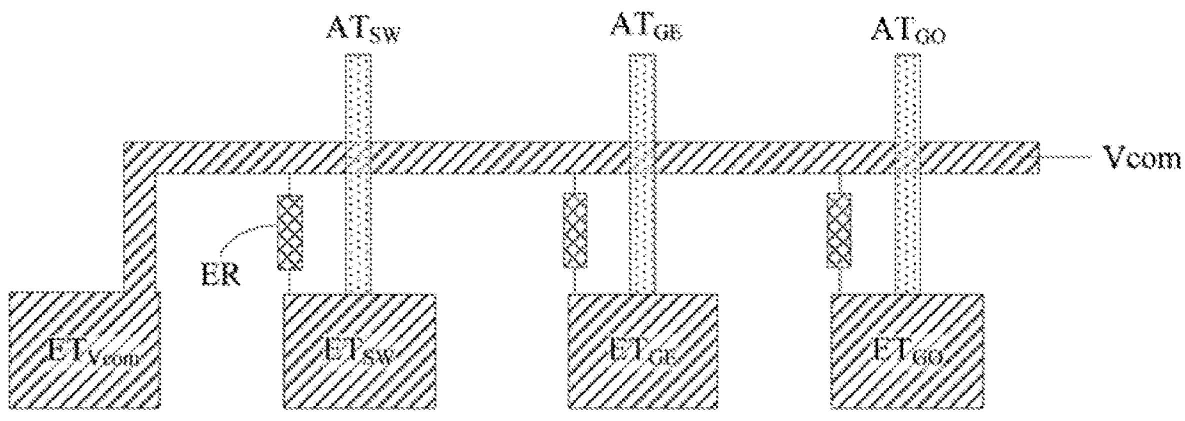
FIG. 1 is a schematic diagram of an antistatic structure in the existing art.

101—base substrate, 102—first electrostatic ring, 103—ground line, 104—second electrostatic ring, 105—transfer electrode, 106—first insulating layer, 107—second insulating layer, 108—pixel electrode, 109—first transfer terminal, g—gate, s—source, d—drain, ac—active layer, $T_1$—first transistor, $T_2$—second transistor, $T_3$—third transistor, $T_4$—fourth transistor, $ETV_{com}$—common voltage test sub-terminal, $ET_{GE}$, $ET_{GO}$, $ET_{DE}$, $ET_{DO}$ and $ET_{SW}$—non-common voltage test sub-terminals, 201—display substrate, 202—third electrostatic ring, 203—first connection line, 204—second connection line, 205—first transfer line, 206—second transfer line, 207—third transfer line, 208—fourth transfer line, 209—fourth electrostatic ring, 210—second transfer terminal, 211—shorting bar, 212—high resistance line, $ATV_{com}$—common voltage test terminal, and $AT_{GE}$, $AT_{GO}$, $AT_{DE}$, $AT_{DO}$ and $AT_{SW}$—non-common voltage test terminals.

DETAIL DESCRIPTION OF EMBODIMENTS

To make the objects, technical solutions and advantages of the embodiments of the present disclosure more apparent, the technical solutions according to the embodiments of the present disclosure will be clearly and completely described below with reference to the drawings of the embodiments of the present disclosure. It should be noted that the sizes and shapes of various components in the drawings are not to scale, but are merely intended to schematically illustrate the present disclosure. The same or similar reference signs refer to the same or similar elements or elements with the same or similar functions throughout the drawings.

Unless otherwise defined, technical or scientific terms used herein are intended to have general meanings as understood by those of ordinary skill in the art. The words “first”, “second” and similar terms used in the description and the claims of the present disclosure do not denote any order, quantity, or importance, but are used merely for distinguishing different components from each other. The word “comprising” or “including” or the like means that the element or item preceding the word contains elements or items that appear after the word or equivalents thereof, but does not exclude other elements or items. The words “inner”, “outer”, “upper”, “lower”, and the like are merely used to indicate a relative positional relationship, and when an absolute position of the described object is changed, the relative positional relationship may be changed accordingly.

A manufacturing process of a display substrate in an electronic paper product includes: preparing a plurality of display substrates on a large-sized base substrate to form a large substrate; cutting the large substrate into a plurality of intermediate substrates for convenient shipment; screen printing a blue membrane on each intermediate substrate to prevent the intermediate substrate from being scratched during shipment; and cutting each intermediate substrate to obtain a display substrate of a target size. In the existing art, the display substrate is provided with a test sub-terminal and a test transistor, the test sub-terminal is electrically connected to a first electrode (for example, a source) of the test transistor, a second electrode (for example, a drain) of the test transistor is connected to a signal line, a test terminal on the intermediate substrate provides test signals for the test sub-terminal, and the test transistor is controlled to be turned on through an IC to perform electrical detection on the signal line. The test transistor is normally turned off in use by a user, and thus will not affect normal display.

Electro-static discharge (ESD) may easily occur in the screen printing process and a film peeling process of the blue membrane, and the test transistor may be damaged due to an influence of ESD and abnormally turned on, thereby affecting normal operation of the electronic paper product. To reduce the influence of ESD, as shown in FIG. 1, in the existing art, each of the non-common voltage test sub-terminals (e.g., $ET_{SW}$, $ET_{GE}$ and $ET_{GO}$) of the display substrate is electrically connected to a common voltage line ($V_{com}$) integrally formed with a common voltage test sub-terminal ($ETV_{com}$) through electrostatic rings (ER), respectively. Since the common voltage line ($V_{com}$) has a relatively large line width, in the case of excessive static electricity accumulated on the non-common voltage test sub-terminals (e.g., $ET_{SW}$, $ET_{GE}$ and $ET_{GO}$), the electrostatic ring (ER) is turned on under an electrostatic high voltage action, so that the static electricity can be discharged to the common voltage line ($V_{com}$) with a larger area through the electrostatic ring (ER), thereby dispersing the influence of ESD and avoiding abnormal turn-on of the test transistor due to an action of the ESD.

Figure 2:
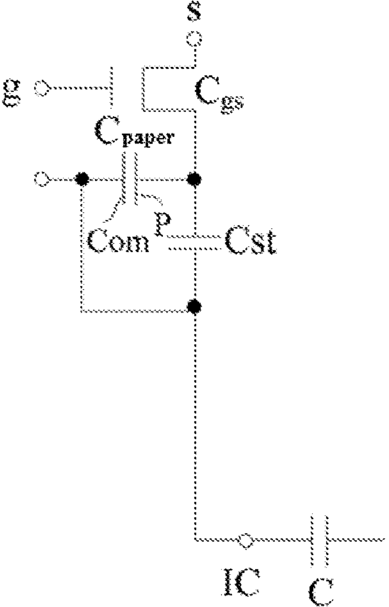
FIG. 2 is a schematic circuit diagram of normally acquiring a common voltage through IC sensing.
Figure 3:
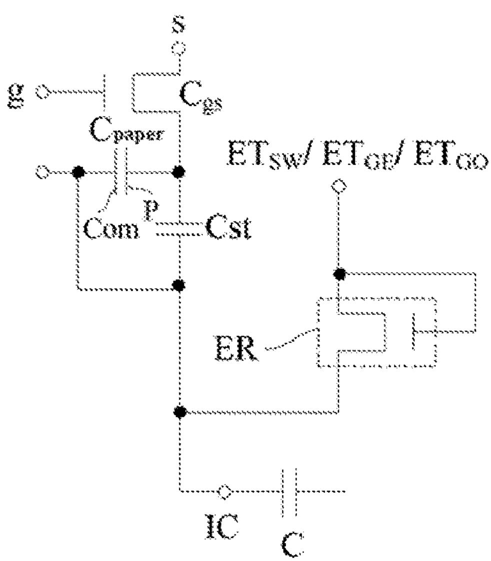
FIG. 3 is a schematic circuit diagram of abnormally acquiring a common voltage through IC sensing.

The common voltage of the electronic paper product plays a role of offsetting $\Delta V_{pixel}$ in the display process so that charged particles (such as microspheres) of three colors, i.e., black, white and red, are all at a normal target display voltage, where $$\Delta V_{pixel} = \frac{C_{gs}}{C_{paper} + C_{st} + C_{gs}} * (V_{gh} - V_{gl}),$$

where $C_{gs}$ represents an overlap capacitance of a gate g and a source s of a pixel transistor, $V_{gh}$ represents a gate voltage for turning on the pixel transistor, $V_{gl}$ represents a gate voltage for turning off the pixel transistor, $C_{paper}$ represents an overlap capacitance between a pixel electrode (P) and a common electrode (Com), and Cst represents a storage capacitance. Generally, the common voltage of the electronic paper product is obtained by means of IC sensing. However, the common voltage obtained by IC sensing has the defects of an overlarge size and severe fluctuations. In view of this, the inventor has studied the IC sensing mechanism of the electronic paper product, and analyzed related influence factors. The study shows that, in the IC sensing stage, as shown in FIG. 2, the common electrode (Com) should be in a floating state, but as shown in FIG. 3, the non-common voltage test sub-terminals (e.g. $ET_{SW}$, $ET_{GE}$ and $ET_{GO}$) cause electric leakage to the common electrode (Com) through the electrostatic ring (ER), so that the common voltage sensed by the IC is pulled to a lower level, the $C_{paper}$ becomes smaller, while $\Delta V_{pixel}$ becomes larger, thereby finally obtaining a relatively large common voltage to offset $\Delta V_{pixel}$ in the display process.

To address the above technical problems in the existing art, an embodiment of the present disclosure provides a display substrate which, referring to FIGS. 4 to 7, includes:

a base substrate 101 including a display region AA and a bezel region BB on at least one side of the display region AA. Optionally, the base substrate 101 may be a flexible substrate made of, for example, polyimide, or a rigid substrate made of, for example, glass.

A plurality of test sub-terminals (e.g., $ET_{DE}$, $ET_{DO}$, $ET_{GE}$, $ET_{GO}$, $ET_{SW}$ and $ETV_{com}$) are positioned in the bezel region, including a common voltage test sub-terminal $ETV_{com}$ and a plurality of non-common voltage test sub-terminals (e.g., $ET_{DE}$, $ET_{DO}$, $ET_{GE}$, $ET_{GO}$ and $ET_{SW}$), where the common voltage test sub-terminal $ETV_{com}$ provides test signals for the common voltage line $V_{com}$, the non-common voltage test sub-terminal $ET_{DE}$ provides test signals for even columns of data lines, the non-common voltage test sub-terminal $ET_{DO}$ provides test signals for odd columns of data lines, the non-common voltage test sub-terminal $ET_{GE}$ provides test signals for even rows of gate lines, the non-common voltage test sub-terminal $ET_{GO}$ provides test signals for odd rows of gate lines, and the non-common voltage test sub-terminal $ET_{SW}$ provides test signals for a first electrode of the test transistor. Optionally, the common voltage line $V_{com}$ is disposed in the bezel region BB in a complete circle. In some embodiments, to reduce a resistance of the common voltage line $V_{com}$, the common voltage line $V_{com}$ may be provided as a double-layer wiring structure in a gate metal layer and a source-drain metal layer, and the common voltage line $V_{com}$ in the gate metal layer may be connected to the common voltage line $V_{com}$ in the source-drain metal layer through a via running through the gate insulating layer (GI).

First electrostatic rings 102 are positioned in the bezel region BB, through which the non-common voltage test sub-terminals (e.g., $ET_{DE}$, $ET_{DO}$, $ET_{GE}$, $ET_{GO}$ and $ET_{SW}$) are arranged in series and/or grounded. Optionally, in FIGS. 4 to 6, each of the first electrostatic rings 102 is electrically connected between two adjacent non-common voltage test sub-terminals (e.g., $ET_{DE}$, $ET_{DO}$, $ET_{GE}$, $ET_{GO}$ and $ET_{SW}$); and in FIG. 7, the first electrostatic ring 102 is electrically connected between each non-common voltage test sub-terminal (e.g., $ET_{DE}$, $ET_{DO}$, $ET_{GE}$, $ET_{GO}$ or $ET_{SW}$) and a ground line 103.

In the display substrate provided in the embodiments of the present disclosure, the non-common voltage test sub-terminals (e.g., $ET_{DE}$, $ET_{DO}$, $ET_{GE}$, $ET_{GO}$ and $ET_{SW}$) are arranged in series and/or grounded through the first electrostatic ring 102, so that when excessive static electricity is accumulated on the non-common voltage test sub-terminals (e.g., $ET_{DE}$, $ET_{DO}$, $ET_{GE}$, $ET_{GO}$ and $ET_{SW}$), the first electrostatic ring 102 is turned on under an electrostatic high voltage action, and a path is formed between the non-common voltage test sub-terminals (e.g., $ET_{DE}$, $ET_{DO}$, $ET_{GE}$, $ET_{GO}$ and $ET_{SW}$), thereby increasing the ESD transmission paths, effectively dispersing the ESD, reducing the adverse effect of ESD on the test transistor electrically connected to the non-common voltage test sub-terminal $ET_{SW}$, and improving the antistatic capability of the product. On the other hand, in the present disclosure, first electrostatic rings 102 are connected in series between the non-common voltage test sub-terminals (e.g., $ET_{DE}$, $ET_{DO}$, $ET_{GE}$, $ET_{GO}$ and $ET_{SW}$), and/or first electrostatic rings 102 are connected between the non-common voltage test sub-terminals (e.g., $ET_{DE}$, $ET_{DO}$, $ET_{GE}$, $ET_{GO}$ and $ET_{SW}$) and the ground (e.g., the ground line 103), so that the signal on the common electrode line $V_{com}$ will not be interfered, thereby preventing electric leakage on the common electrode (Com) electrically connected to the common electrode line $V_{com}$ through the first electrostatic rings 102, and further ensuring accuracy of the common voltage obtained by IC sensing.

Figure 6:
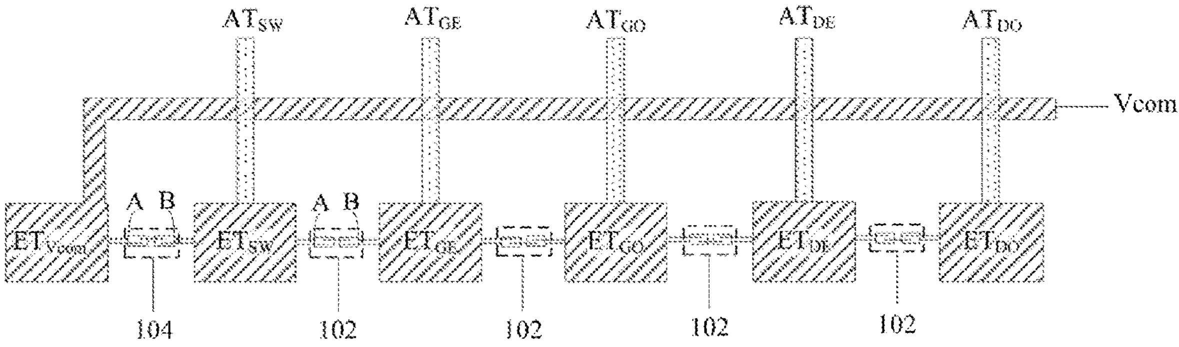
FIG. 6 is another schematic diagram of an antistatic structure according to an embodiment of the present disclosure.

In some embodiments, as shown in FIG. 6, the display substrate provided in the embodiments of the present disclosure may further include a second electrostatic ring 104 electrically connected between the common voltage test sub-terminal $ETV_{com}$ and an adjacent non-common voltage test sub-terminal (e.g., any one of $ET_{DE}$, $ET_{DO}$, $ET_{GE}$, $ET_{GO}$ or $ET_{SW}$). The second electrostatic ring 104 and the first electrostatic ring 102 each include a plurality of transistors electrically (for example, a first transistor $T_1$, a second transistor $T_2$, a third transistor $T_3$, and a fourth transistor $T_4$) electrically connected to each other. The transistors in the second electrostatic ring 104 have the same channel width-to-length ratio, the transistors in the first electrostatic ring 102 have the same channel width-to-length ratio, and the channel width-to-length ratio of the transistors in the second electrostatic ring 104 is smaller than the channel width-to-length ratio of the transistors in the first electrostatic ring 102. With such arrangement of the second electrostatic ring 104, in the case of excessive static electricity accumulated on the common voltage test sub-terminal $ETV_{com}$ and the adjacent non-common voltage test sub-terminal (e.g., any one of $ET_{DE}$, $ET_{DO}$, $ET_{GE}$, $ET_{GO}$ or $ET_{SW}$), the second electrostatic ring 104 is turned on under an electrostatic high voltage action, thereby increasing electrostatic discharge paths and further reducing an influence of ESD on the test transistor. Moreover, with the channel width-to-length ratio of the transistors in the second electrostatic ring 104 being smaller than the channel width-to-length ratio of the transistors in the first electrostatic ring 102, the transistors in the second electrostatic ring 104 may have a smaller leakage current, thereby minimizing the influence of the second electrostatic ring 104 on the common voltage obtained by IC sensing. Optionally, the transistors in the first electrostatic ring 102 have a channel width-to-length ratio of 15/28.5, the transistors in the second electrostatic ring 104 have a channel width-to-length ratio greater than 15/60 and smaller than 15/28.5. For example, the transistors in the second electrostatic ring 104 have a channel width-to-length ratio of 15/40.

It should be understood that a voltage of the test signal applied to each test sub-terminal (e.g., $ET_{DE}$, $ET_{DO}$, $ET_{GE}$, $ET_{GO}$, $ET_{SW}$ or $ETV_{com}$) in electrical tests is much smaller than an electrostatic voltage generated during screen printing or peeling of the blue membrane, so that both the first electrostatic ring 102 and the second electrostatic ring 104 can be kept in an off state in electrical tests, and thus, short circuit between different test sub-terminals (e.g., $ET_{DE}$, $ET_{DO}$, $ET_{GE}$, $ET_{GO}$, $ET_{SW}$ and $ETV_{com}$) in electrical tests can be effectively avoided. In other words, the first electrostatic ring 102 and the second electrostatic ring 104 will not affect a result of the electrical test.

Figure 4:
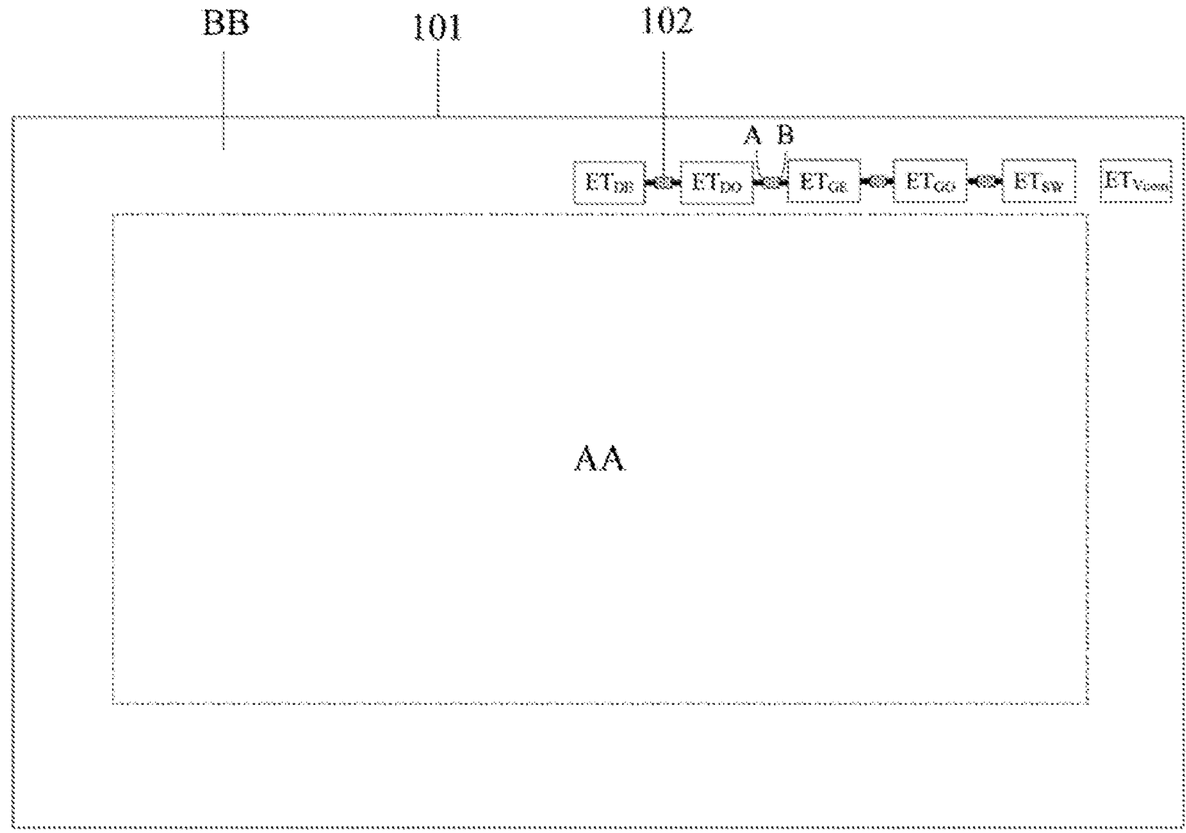
FIG. 4 is a schematic structural diagram of a display substrate according to an embodiment of the present disclosure.
Figure 5:
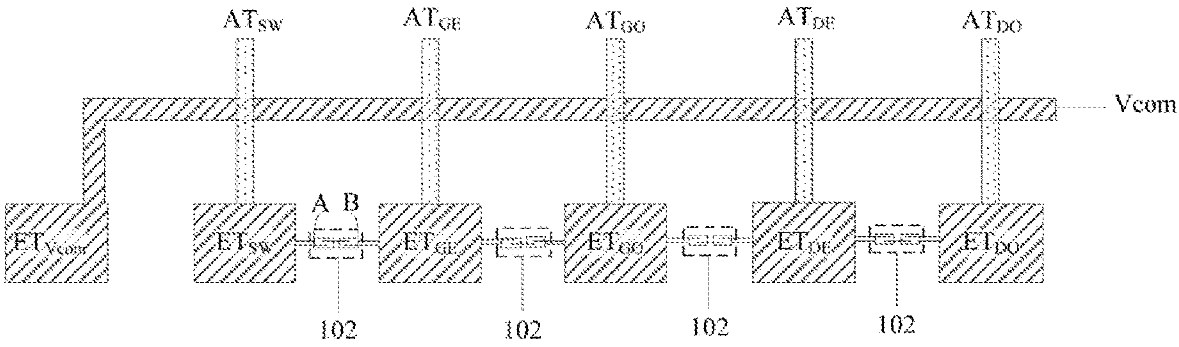
FIG. 5 is a schematic diagram of an antistatic structure according to an embodiment of the present disclosure.
Figure 7:
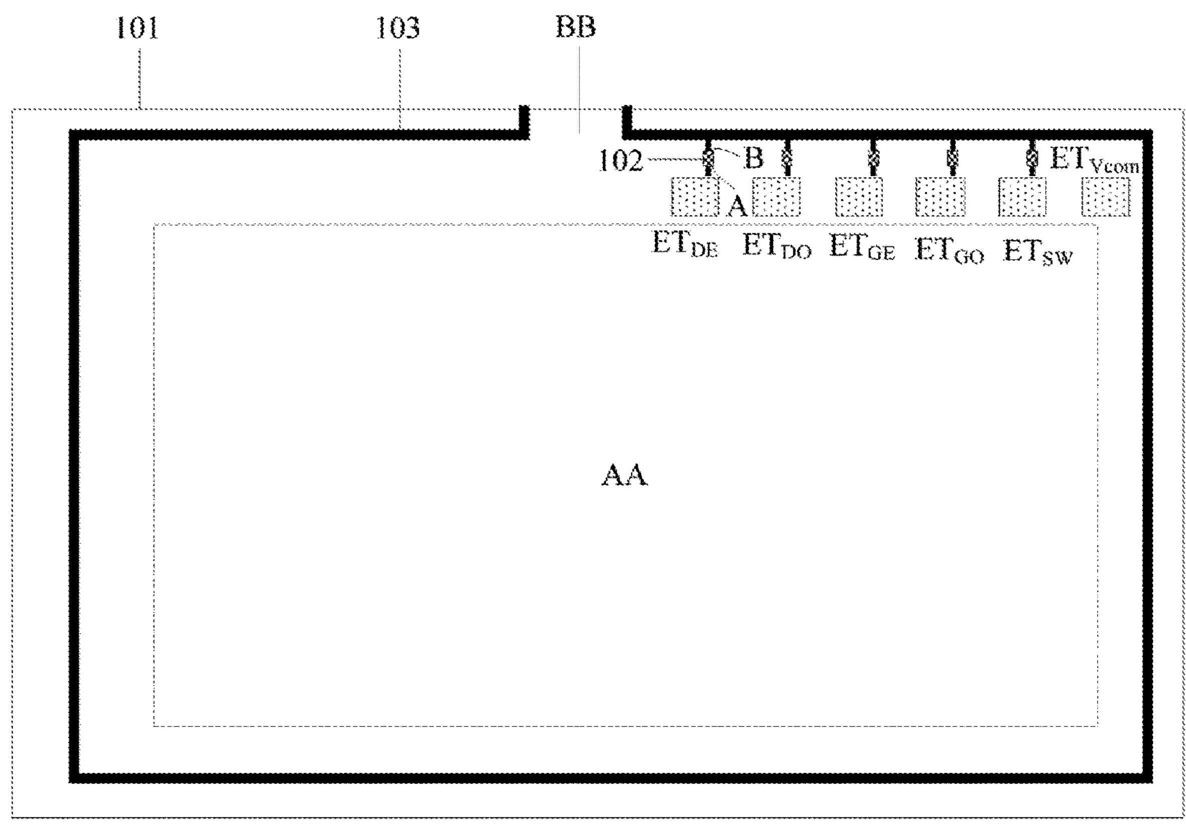
FIG. 7 is another schematic structural diagram of a display substrate according to an embodiment of the present disclosure.
Figure 8:
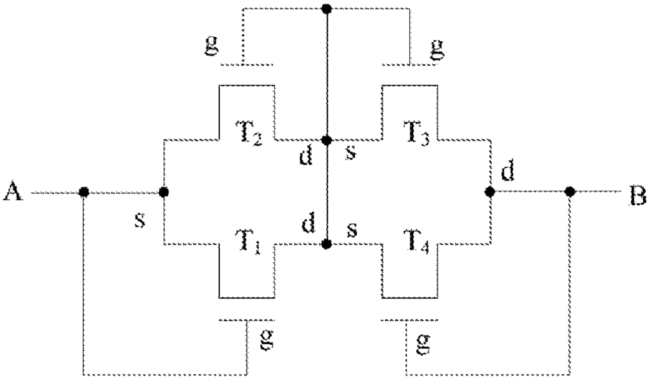
FIG. 8 is a circuit diagram of an electrostatic ring according to an embodiment of the present disclosure.

In some embodiments, in the intermediate substrate provided in the embodiments of the present disclosure, as shown in FIGS. 4 to 7, the first electrostatic ring 102 includes a first connection end A and a second connection end B. In FIGS. 4 to 6, the first connection end A and the second connection end B of the first electrostatic ring 102 are electrically connected to two adjacent non-common voltage test sub-terminals (e.g., $ET_{DE}$, $ET_{DO}$, $ET_{GE}$, $ET_{GO}$ and $ET_{SW}$), respectively. In FIG. 7, the first connection end A of the first electrostatic ring 102 is electrically connected to a non-common voltage test sub-terminal (e.g., $ET_{DE}$, $ET_{DO}$, $ET_{GE}$, $ET_{GO}$ or $ET_{SW}$), and the second connection end B is electrically connected to the ground line 103.

In some embodiments, as shown in FIGS. 8 to 12, the first electrostatic ring 102 may include four transistors, where a gate g of a first transistor $T_1$, a first electrode s of the first transistor $T_1$, and a first electrode s of a second transistor $T_2$ are electrically connected together to serve as the first connection end A; a second electrode d of the first transistor $T_1$, a second electrode d of the second transistor $T_2$, a gate g of the second transistor $T_2$, a gate g of a third transistor $T_3$, a first electrode s of the third transistor $T_3$, and a first electrode s of a fourth transistor $T_4$ are electrically connected together; and a gate g of the fourth transistor $T_4$, a second electrode d of the fourth transistor $T_4$, and a second electrode d of the third transistor $T_3$ are electrically connected together to serve as the second connection end B, so that the four transistors form a symmetrical closed loop circuit which can be automatically turned on under an electrostatic high pressure action. Optionally, the first electrode s of the transistor may be a source, and the second electrode d may be a drain, or the first electrode s of the transistor is a drain and the second electrode d is a source. The case where the first electrode s is a source and the second electrode is a drain is taken as an example for illustration in the present disclosure.

In some embodiments, in the display substrate provided in the embodiments of the present disclosure, the plurality of transistors in the second electrostatic ring 104 may be electrically connected in the same manner as the plurality of transistors in the first electrostatic ring 102, so that under the same electrostatic influence, the first electrostatic ring 102 can be more easily turned on, and thus the antistatic capability is improved, while ensuring that an off-state leakage current of the transistors in the second electrostatic ring 104 is smaller, thereby minimizing the influence of the second electrostatic ring 104 on the common voltage obtained by IC sensing. In addition, as can be seen from FIG. 6, the first connection end A of the second electrostatic ring 104 is electrically connected to the common voltage test sub-terminal $ETV_{com}$, and the second connection end B is electrically connected to a non-common voltage test sub-terminal (e.g., $ET_{DE}$, $ET_{DO}$, $ET_{GE}$, $ET_{GO}$ or $ET_{SW}$).

In some embodiments, to simplify the manufacturing process, the first transistor $T_1$, the second transistor $T_2$, the third transistor $T_3$, and the fourth transistor $T_4$ in the present disclosure may be the same type of P-type transistors or N-type transistors. The P-type transistor is turned on when a voltage difference $V_{gs}$ between the gate g and the first electrode s of the transistor and a threshold voltage $V_{TH}$ satisfy $V_{gs}<V_{th}$, and is turned off when the voltage difference $V_{gs}$ between the gate g and the first electrode s of the transistor and the threshold voltage $V_{th}$ satisfy $V_{gs}>V_{th}$. The N-type transistor is turned on when a voltage difference $V_{gs}$ between the gate g and the first electrode s of the transistor and a threshold voltage $V_{th}$ satisfy $V_{gs}>V_{th}$, and is turned off when the voltage difference $V_{gs}$ between the gate g and the first electrode s of the transistor and the threshold voltage $V_{th}$ satisfy $V_{gs}<V_{th}$.

In some embodiments, the first transistor $T_1$, the second transistor $T_2$, the third transistor $T_3$, and the fourth transistor $T_4$ may be amorphous silicon transistors, polysilicon transistors, oxide transistors, or the like. Optionally, since the oxide transistors using a metal oxide semiconductor material (e.g., indium gallium zinc oxide (IGZO)) as the active layer have a smaller leakage current, and in use by a user, the first transistor $T_1$, the second transistor $T_2$, the third transistor $T_3$, and the fourth transistor $T_4$ need to be kept off, in order to reduce the leakage current in the off state, the first transistor $T_1$, the second transistor $T_2$, the third transistor $T_3$, and the fourth transistor $T_4$ are preferably configured as oxide transistors in a specific implementation.

In some embodiments, the gates g, the first electrodes s, and the second electrodes d of the first transistor $T_1$, the second transistor $T_2$, the third transistor $T_3$, and the fourth transistor $T_4$ may be each made of a material including a metal material or an alloy material, for example, including a single-layer metal structure or a multi-layer metal structure formed by molybdenum, aluminum, titanium, or the like. Exemplarily, the multi-layer metal structure is formed by a titanium metal layer/an aluminum metal layer/a titanium metal layer arranged in stack.

Figure 9:
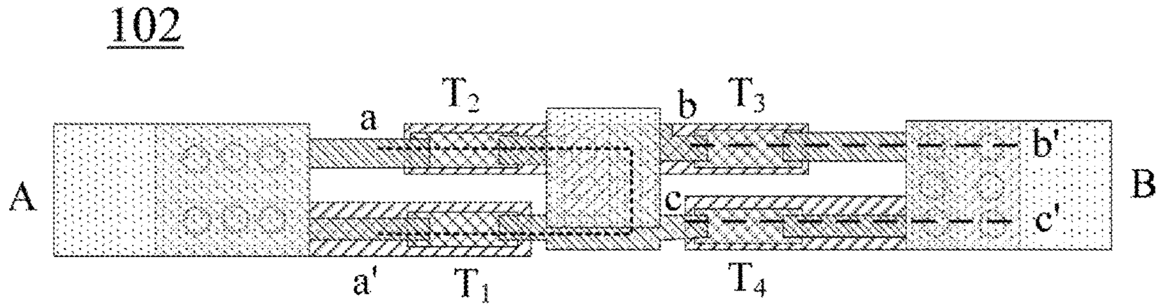
FIG. 9 is a schematic structural diagram of an electrostatic ring according to an embodiment of the present disclosure.
Figure 10:
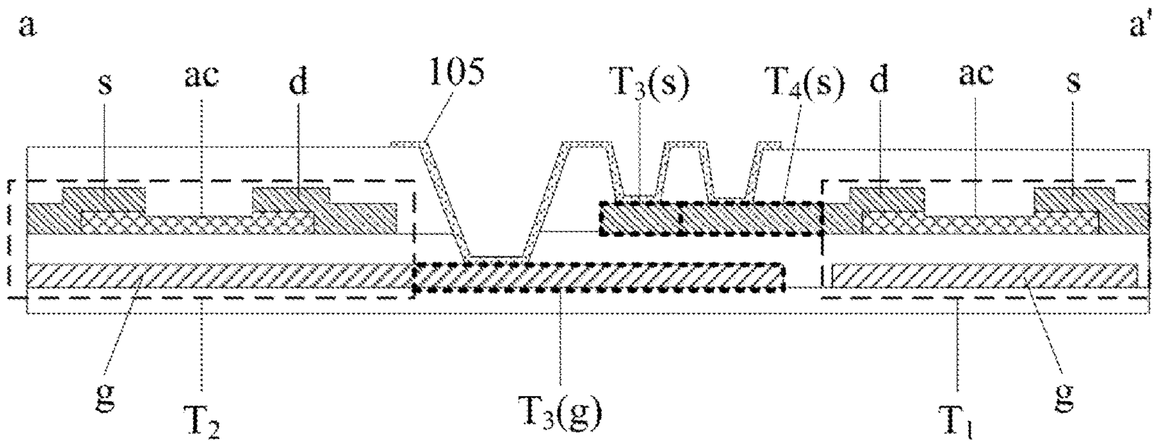
FIG. 10 is a sectional view taken along a direction a-a' in FIG. 9.
Figure 11:
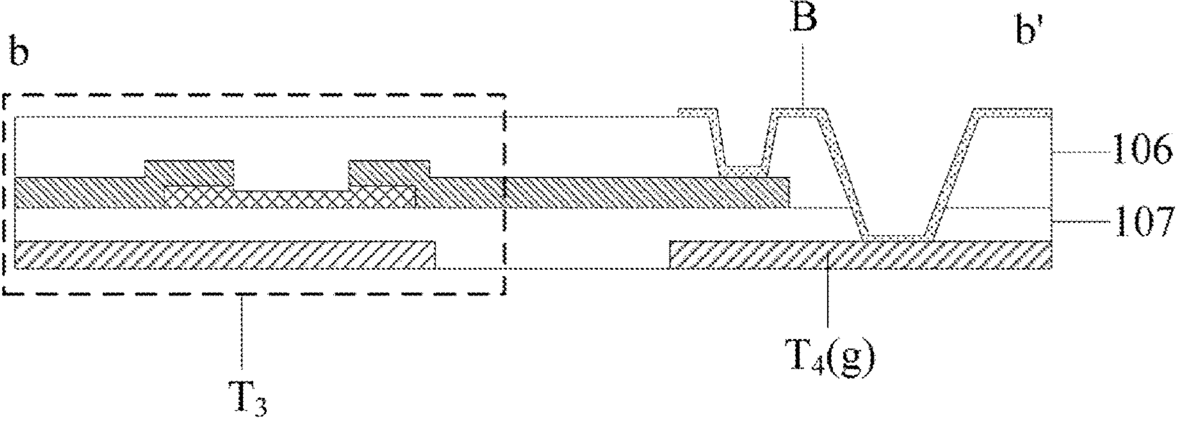
FIG. 11 is a sectional view taken along a direction b-b' in FIG. 9.
Figure 12:
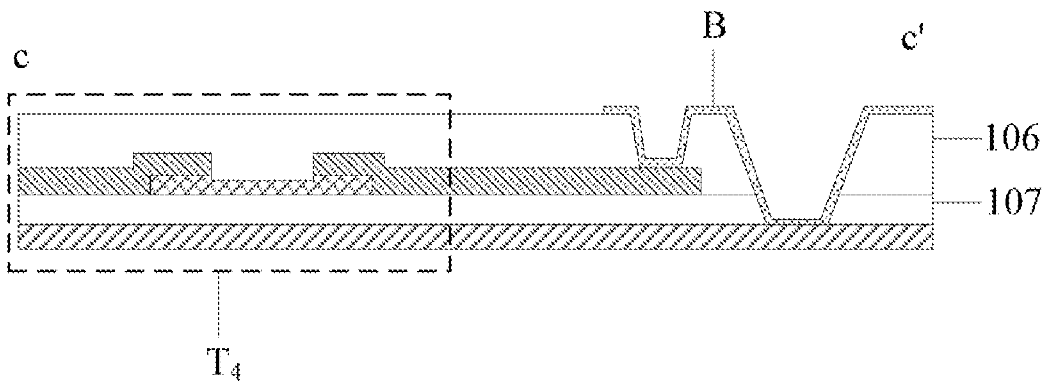
FIG. 12 is a sectional view taken along a direction c-c' in FIG. 9.

In some embodiments, as shown in FIGS. 9 and 10, the display substrate provided in the embodiments of the present disclosure may further include a transfer electrode 105 above a layer where the first electrostatic ring 102 is located. The transfer electrode 105 is electrically connected to the second electrode d of the first transistor $T_1$, the second electrode d of the second transistor $T_2$, the gate g of the second transistor $T_2$, the gate g of the third transistor $T_3$, the first electrode s of the third transistor $T_3$, and the first electrode s of the fourth transistor $T_4$. In some embodiments, the second electrode d of the first transistor $T_1$, the second electrode d of the second transistor $T_2$, the first electrode s of the third transistor $T_3$, and the first electrode s of the fourth transistor $T_4$ are integrally formed, and the gate g of the second transistor $T_2$ and the gate g of the third transistor $T_3$ are integrally formed, to facilitate to be electrically connected to the transfer electrode 105.

Optionally, the first transistor $T_1$, the second transistor $T_2$, the third transistor $T_3$, and the fourth transistor $T_4$ are bottom-gate type transistors, the transfer electrode 105 is electrically connected to the second electrode d of the first transistor $T_1$, the second electrode d of the second transistor $T_2$, the first electrode s of the third transistor $T_3$, and the first electrode s of the fourth transistor $T_4$ through a via running through the first insulating layer 106, and is electrically connected to the gate g of the second transistor $T_2$ and the gate g of the third transistor $T_3$ through a via running through the first insulating layer 106 and the second insulating layer 107. In this case, the via running through only the first insulating layer 106, and the via running through both the first insulating layer 106 and the second insulating layer 107, may be prepared through a single patterning process, thereby avoiding an additional patterning process of the second insulating layer 107. Apparently, in some embodiments, the second electrode d of the first transistor $T_1$, the second electrode d of the second transistor $T_2$, the gate g of the second transistor $T_2$, the gate g of the third transistor $T_3$, the first electrode s of the third transistor $T_3$, and the first electrode s of the fourth transistor $T_4$ may be electrically connected through a via running through the second insulating layer 107, which is not limited herein. In some embodiments, the first insulating layer 106 and the second insulating layer 107 is made of a material including, but not limited to, silicon oxide, silicon nitride, silicon oxynitride, or the like. The first insulating layer 106 and the second insulating layer 107 may have a single-film structure or a stacked structure, which is not limited herein.

Figure 13:
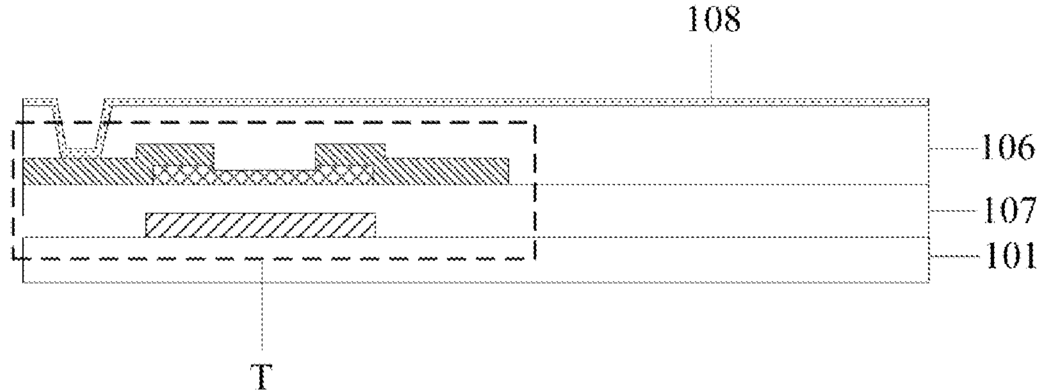
FIG. 13 is a schematic structural diagram of a sub-pixel in a display substrate according to an embodiment of the present disclosure.

In some embodiments, as shown in FIG. 13, the display substrate provided in the embodiments of the present disclosure may further include a pixel transistor T and a pixel electrode 108 electrically connected to each other, and the pixel electrode 108 is located above a layer where the pixel transistor T is located. Optionally, the same functional film layers of the pixel transistor T are disposed in the same layer and made of the same material as those of the first transistor $T_1$, the second transistor $T_2$, the third transistor $T_3$, and the fourth transistor $T_4$. In other words, a gate g of the pixel transistor T is disposed in the same layer and made of the same material as the gates g of the first transistor $T_1$, the second transistor $T_2$, the third transistor $T_3$, and the fourth transistor $T_4$, a first electrode s and a second electrode d of the pixel transistor T are disposed in the same layer and made of the same material as the first electrodes s and the second electrodes d of the first transistor $T_1$, the second transistor $T_2$, the third transistor $T_3$, and the fourth transistor $T_4$, and an active layer of the pixel transistor T is disposed in the same layer and made of the same material as the active layers ac of the first transistor $T_1$, the second transistor $T_2$, the third transistor $T_3$, and the fourth transistor $T_4$. In some embodiments, the transfer electrode 105 and the pixel electrode 108 may be disposed in the same layer and made of the same material, so that the transfer electrode 105 is formed at the same time when the pixel electrode 108 is patterned, thereby avoiding additional film layer and patterning process for the transfer electrode 105. Optionally, the pixel electrode 108 may be made of a material including indium tin oxide (ITO), indium zinc oxide (IZO), or the like.

It should be noted that in the present disclosure, reference to "the same layer and the same material" refers to a layer structure formed by forming a film layer for forming a specific pattern by the same film formation process and then performing a single patterning process with the same mask. In other words, one patterning process corresponds to one mask (also referred to as a photo mask). Depending on the specific pattern, one patterning process may include multiple exposure, development or etching processes, and the formed specific pattern in the layer structure may be continuous or discontinuous, may have a uniform height or thickness, or may have a varied height or thickness.

With continued reference to FIG. 13, it can be seen that the pixel electrode 108 is electrically connected to the pixel transistor T through a via running through the first insulating layer 106, and therefore, in the case where the transfer electrode 105 and the pixel electrode 108 are disposed in the same layer and made of the same material, a via running through the first insulating layer 106 and electrically connecting the pixel electrode 108 to the pixel transistor T, a via running through the first insulating layer 106 and electrically connecting the transfer electrode 105 to the second electrode d of the first transistor $T_1$, the second electrode d of the second transistor $T_2$, the first electrode s of the third transistor $T_3$, and the first electrode s of the fourth transistor $T_4$, and a via running through the first insulating layer 106 and the second insulating layer 107 and electrically connecting the transfer electrode 105 to the gate g of the second transistor $T_2$ and the gate g of the third transistor $T_3$, may be simultaneously formed in the first insulating layer 106 and the second insulating layer 107 through a single patterning process, thereby avoiding the additional patterning process for a via associated with the transfer electrode 105.

Figure 14:
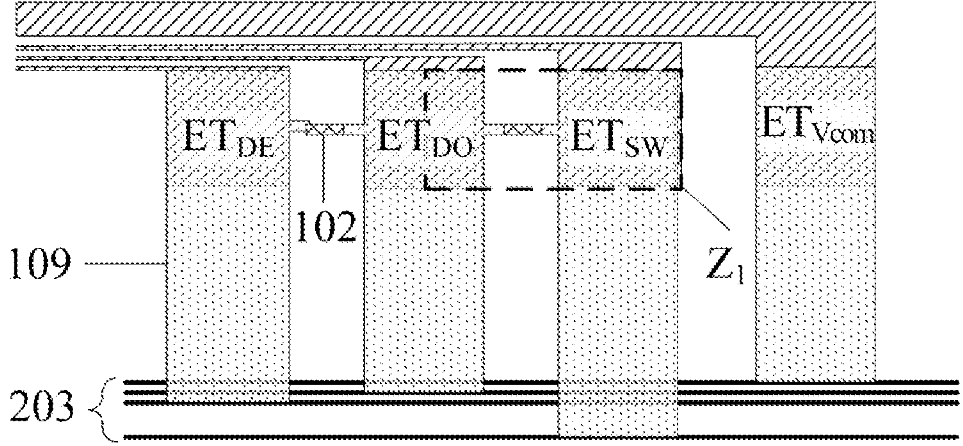
FIG. 14 is a schematic diagram of an antistatic structure on a display substrate according to an embodiment of the present disclosure.
Figure 15:
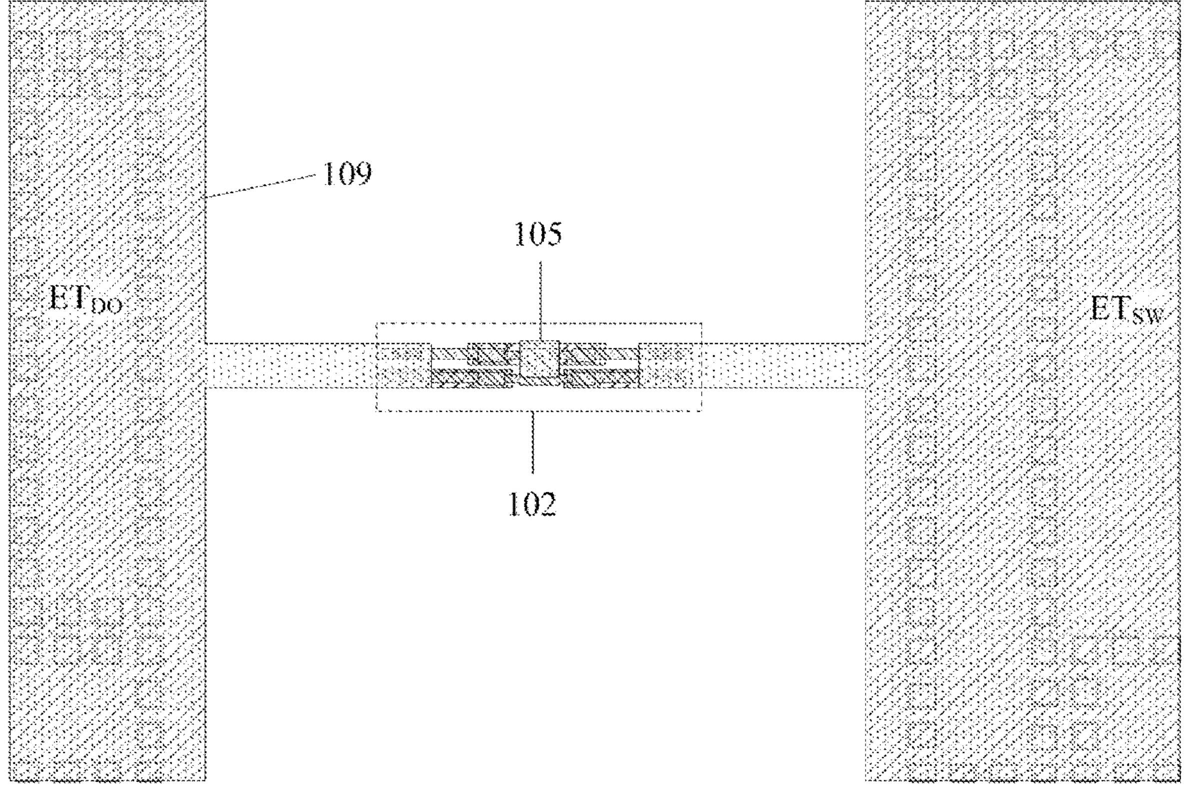
FIG. 15 is an enlarged schematic diagram of region $Z_1$ in FIG. 14.

In some embodiments, as shown in FIGS. 14 and 15, the display substrate provided in the embodiments of the present disclosure further includes a plurality of first transfer terminals 109, and each of the first transfer terminals 109 is electrically connected to one of the test sub-terminals (e.g., $ET_{DE}$, $ET_{DO}$, $ET_{SW}$ and $ETV_{com}$). Optionally, the first electrostatic ring 102 is electrically connected to the non-common voltage test sub-terminals (e.g., $ET_{DE}$, $ET_{DO}$ and $ET_{SW}$) through the first transfer terminals 109. In some embodiments, the plurality of first transfer terminals 109 may be disposed in the same layer and made of the same material as the pixel electrode 108, so that the plurality of first transfer terminals 109 may be formed at the same time when the pixel electrode 108 is patterned, thereby avoiding additional film layer and patterning process for the first transfer terminals 109.

Figure 16:
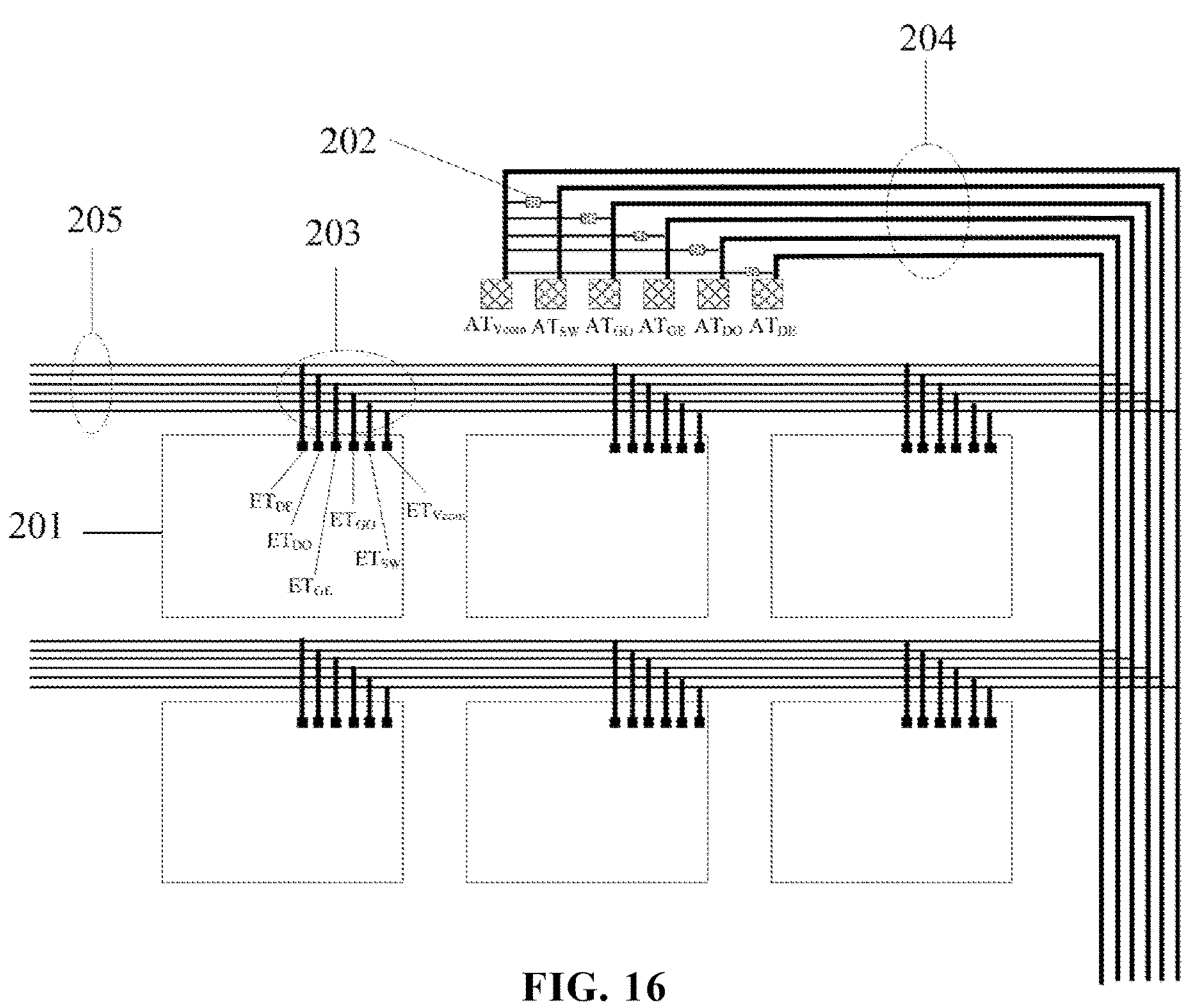
FIG. 16 is a schematic structural diagram of an intermediate substrate according to an embodiment of the present disclosure.

Based on the same inventive concept, an embodiment of the present disclosure provides an intermediate substrate which, as shown in FIG. 16, includes a plurality of display substrates 201 as described in the above embodiments of the present disclosure. The intermediate substrate is used to solve the problem in a principle similar to that of the display substrate, and therefore, the implementation of the intermediate substrate in the embodiments of the present disclosure may refer to the implementation of the display substrate described above, and repeated descriptions are omitted here.

Figure 17:
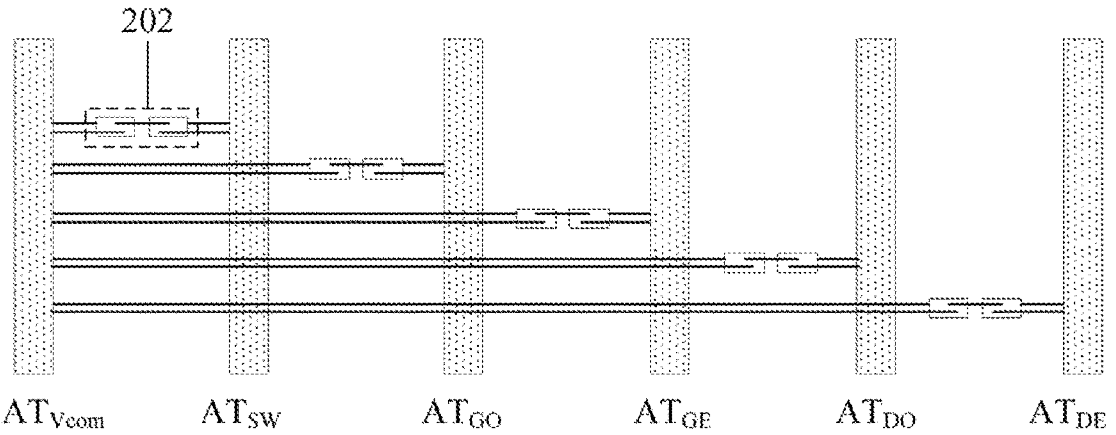
FIG. 17 is a schematic diagram of an antistatic structure on an intermediate substrate according to an embodiment of the present disclosure.

In some embodiments, as shown in FIGS. 16 and 17, the intermediate substrate provided in the embodiments of the present disclosure further includes a plurality of test terminals (e.g., $AT_{GO}$, $AT_{GE}$, $AT_{DO}$, $AT_{DE}$, $AT_{SW}$ and $ATV_{com}$) and third electrostatic rings 202 on a side of a region where the plurality of display substrates 201 are located. The plurality of test terminals (e.g., $AT_{GO}$, $AT_{GE}$, $AT_{DO}$, $AT_{DE}$, $AT_{SW}$ and $ATV_{com}$) include a common voltage test terminal $ATV_{com}$ and non-common voltage test terminals (e.g., $AT_{GO}$, $AT_{GE}$, $AT_{DO}$, $AT_{DE}$ or $AT_{SW}$). The common voltage test terminal $ATV_{com}$ is electrically connected to the common voltage test sub-terminal $ETV_{com}$, and each of the non-common voltage test terminals (e.g., $AT_{GO}$, $AT_{GE}$, $AT_{DO}$, $AT_{DE}$ or $AT_{SW}$) is electrically connected to a non-common voltage test sub-terminal (e.g., $ET_{GO}$, $ET_{GE}$, $ET_{DO}$, $ET_{DE}$ Or $ET_{SW}$).

Optionally, a plurality of non-common voltage test sub-terminals (e.g., $ET_{GO}$, $ET_{GE}$, $ET_{DO}$, $ET_{DE}$ and $ET_{SW}$) are provided, and at least two of the non-common voltage test terminals (e.g., $ET_{GO}$, $ET_{GE}$, $ET_{DO}$, $ET_{DE}$ and $ET_{SW}$) are connected to the common voltage test terminal $ETV_{com}$ through the third electrostatic rings 202, respectively. In some embodiments, each non-common voltage test sub-terminal (e.g., $ET_{GO}$, $ET_{GE}$, $ET_{DO}$, $ET_{DE}$ or $ET_{SW}$) is electrically connected to a corresponding non-common voltage test terminal (e.g., $AT_{GO}$, $AT_{GE}$, $AT_{DO}$, $AT_{DE}$ or $AT_{SW}$) through one third electrostatic ring 202.

In the intermediate substrate provided in the embodiments of the present disclosure, the common voltage test terminal $ATV_{com}$ is electrically connected to the common voltage test sub-terminal $ETV_{com}$, and the non-common voltage test terminal (e.g., $AT_{GO}$, $AT_{GE}$, $AT_{DO}$, $AT_{DE}$ or $AT_{SW}$) is electrically connected to a non-common voltage test sub-terminal (e.g., $ET_{GO}$, $ET_{GE}$, $ET_{DO}$, $ET_{DE}$ or $ET_{SW}$), so that the static electricity accumulated on each non-common voltage test sub-terminal (e.g., $ET_{GO}$, $ET_{GE}$, $ET_{DO}$, $ET_{DE}$ or $ET_{SW}$) and the common voltage test sub-terminal ($ETV_{com}$) is transferred to the electrically connected corresponding non-common voltage test terminal (e.g. $AT_{GO}$, $AT_{GE}$, $AT_{DO}$, $AT_{DE}$ or $AT_{SW}$) and the common voltage test terminal $ATV_{com}$. Moreover, since the third electrostatic ring 202 is electrically connected between the common voltage test terminal $ATV_{com}$ and the non-common voltage test terminal (e.g. go, $AT_{GE}$, $AT_{DO}$, $AT_{DE}$ or $AT_{SW}$), the third electrostatic ring 202 is turned on under an electrostatic high voltage action, so that the non-common voltage test terminal (e.g. $AT_{GO}$, $AT_{GE}$, $AT_{DO}$, $AT_{DE}$ or $AT_{SW}$), the first electrostatic ring 102, the common voltage test terminal $ATV_{com}$, the common voltage test sub-terminal $ETV_{com}$, and the common voltage line $V_{com}$ are sequentially electrically connected to each other and form a path through which the static electricity can be discharged to the common voltage line $V_{com}$ with a larger area, thereby dispersing the influence of ESD and avoiding abnormal turn-on of the test transistor due to an action of the ESD. Moreover, as shown in FIGS. 4 and 7, after the intermediate substrate is cut into a display substrate 201 of a target size, since the common voltage test terminal $ATV_{com}$, the non-common voltage test terminal (e.g., $AT_{GO}$, $AT_{GE}$, $AT_{DO}$, $AT_{DE}$ or $AT_{SW}$) and the third electrostatic ring 202 therebetween are all cut off, the common voltage obtained by IC sensing will not affected by electric leakage of the third electrostatic ring 202 in the process of IC sensing, thereby obtaining an accurate common voltage.

In some embodiments, in the display substrate provided in the embodiments of the present disclosure, the third electrostatic ring 202 may have the same structure as the first electrostatic ring 102, so that the third electrostatic ring 202 and the first electrostatic ring 102 can be prepared with the same process parameters, thereby simplifying the manufacturing process of the electrostatic rings. In addition, since the channel width-to-length ratio of the transistors in the first electrostatic ring 102 is greater than the channel width-to-length ratio of the transistors in the second electrostatic ring 104, the first electrostatic ring 102 is more easily to be turned on under an influence of ESD, and accordingly, the third electrostatic ring 202 having the same structure as the first electrostatic ring 102 is also more easily to be turned on under an influence of ESD, thereby facilitating ESD dispersion and improving the antistatic capability of the product.

In some embodiments, in the intermediate substrate provided in the embodiments of the present disclosure, the plurality of test terminals (e.g., $AT_{GO}$, $AT_{GE}$, $AT_{DO}$, $AT_{DE}$, $AT_{SW}$ and $ATV_{com}$) and the plurality of test sub-terminals (e.g., $ET_{GO}$, $ET_{GE}$, $ET_{DO}$, $ET_{DE}$, $ET_{SW}$ and $ETV_{com}$) may be disposed in the same layer and made of the same material as the gates of the first transistor $T_1$, the second transistor $T_2$, the third transistor $T_3$, and the fourth transistor $T_4$, so that one conductive film layer may be used to prepare the gates of the first transistor $T_1$, the second transistor $T_2$, the third transistor $T_3$, and the fourth transistor $T_4$, thereby avoiding additional film layers for the plurality of test terminals (e.g., $AT_{GO}$, $AT_{GE}$, $AT_{DO}$, $AT_{DE}$, $AT_{SW}$ and $ATV_{com}$) and the plurality of test sub-terminals (e.g., $ET_{GO}$, $ET_{GE}$, $ET_{DE}$, $ET_{SW}$ and $ETV_{com}$), and eliminating separate processes for manufacturing the plurality of test terminals (e.g., $AT_{GO}$, $AT_{GE}$, $AT_{DO}$, $AT_{DE}$, $AT_{SW}$ and $ATV_{com}$) and the plurality of test sub-terminals (e.g., $ET_{GO}$, $ET_{GE}$, $ET_{DO}$, $ET_{DE}$, $ET_{SW}$ and $ETV_{com}$).

In some embodiments, as shown in FIG. 16, the intermediate substrate provided in the embodiments of the present disclosure may further include a plurality of first connection lines 203, a plurality of second connection lines 204, and a plurality of first transfer lines 205. The plurality of first connection lines 203 and the plurality of second connection lines 204 are disposed in the same layer and made of the same material, and the plurality of first connection lines 203 and the plurality of first transfer lines 205 are disposed in different layers. Each of the first connection lines 203 is electrically connected to one of the test sub-terminals (e.g., $ET_{GO}$, $ET_{GE}$, $ET_{DO}$, $ET_{DE}$, $ET_{SW}$ and $ETV_{com}$), each of the second connection lines 204 is electrically connected to one of the test terminals (e.g., $AT_{GO}$, $AT_{GE}$, $AT_{DO}$, $AT_{DE}$, $AT_{SW}$ and $ATV_{com}$), and each of the first transfer lines 205 is electrically connected between one of the first connection lines 203 and one of the second connection lines 204, so that each test sub-terminal (e.g., $ET_{GO}$, $ET_{GE}$, $ET_{DO}$, $ET_{DE}$, $ET_{SW}$ or $ETV_{com}$) is electrically connected to the corresponding test terminal (e.g., $AT_{GO}$, $AT_{GE}$, $AT_{DO}$, $AT_{DE}$, $AT_{SW}$ or $ATV_{com}$) through the corresponding first connection line 203, first transfer line 205, and second connection line 204 in sequence. As can be seen from FIG. 16, in the case of a plurality of first connection lines 203 and a plurality of second connection lines 204 disposed in the same layer, made of the same material and arranged in one-to-one correspondence, a first connection line 203 is electrically connected to the corresponding second connection line 204 through a first transfer line 205 in a different layer, which can not only effectively avoid short circuit between different first connection lines 203, but also effectively avoid short circuit between different second connection lines 204.

Figure 18:
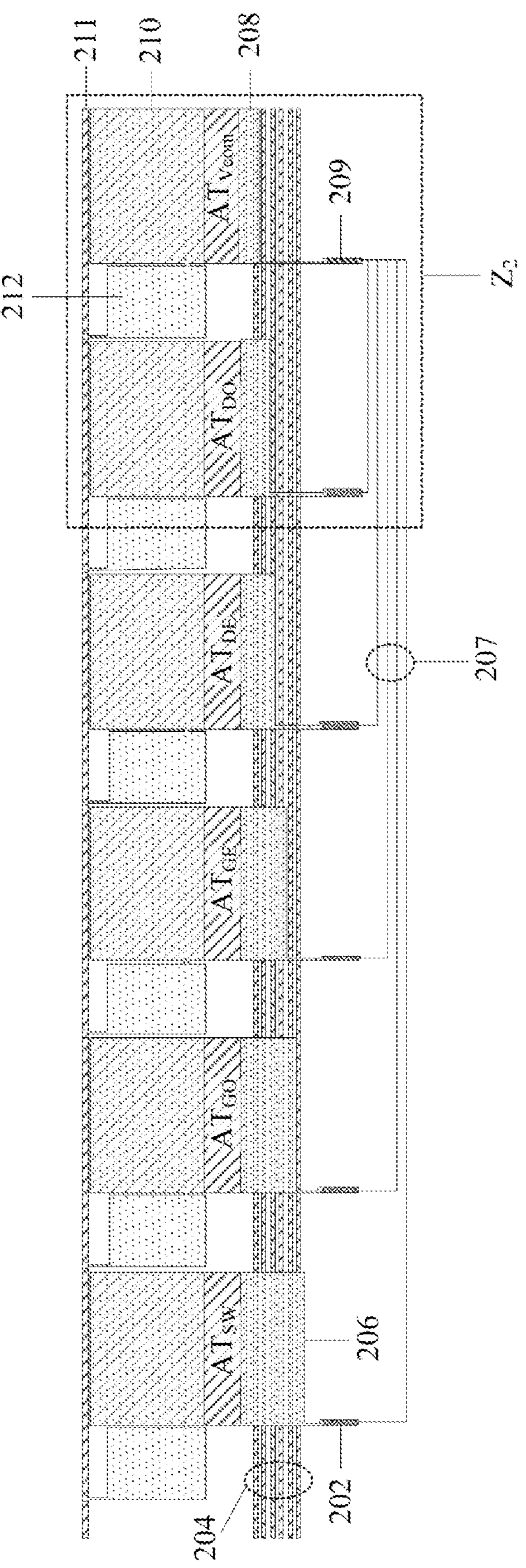
FIG. 18 is another schematic diagram of an antistatic structure on an intermediate substrate according to an embodiment of the present disclosure.
Figure 20:
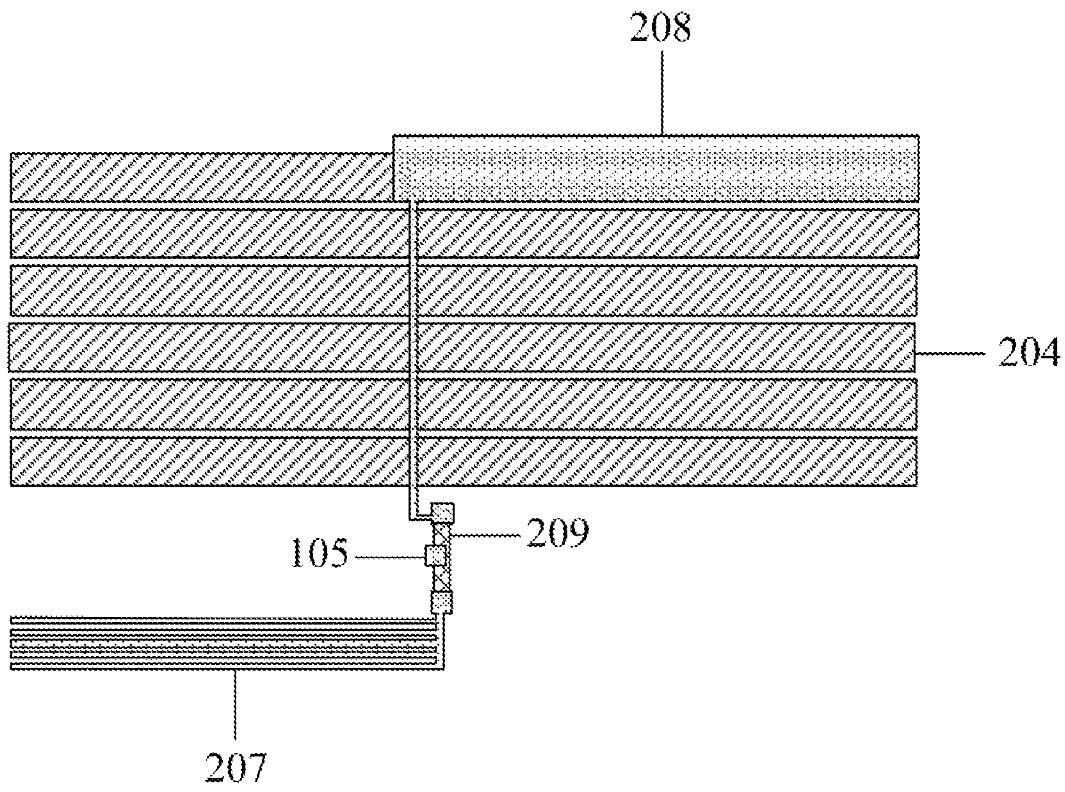
FIG. 20 is an enlarged schematic diagram of region $Z_3$ in FIG. 19.

In some embodiments, as shown in FIGS. 18 and 20, the intermediate substrate provided in the embodiments of the present disclosure further includes a plurality of second transfer lines 206, a plurality of third transfer lines 207, and one fourth transfer line 208. Each of the non-common voltage test terminals (e.g., $AT_{GO}$, $AT_{GE}$, $AT_{DO}$, $AT_{DE}$ and $AT_{SW}$) is electrically connected to a corresponding one of the second connection lines 204 through one of the second transfer lines 206, each of the second transfer lines 206 is electrically connected to one of the third transfer lines 207 through the third electrostatic ring 202, the plurality of third transfer lines 207 are electrically connected to the fourth transfer line 208, and the common voltage test terminal $ATV_{com}$ is electrically connected to a corresponding one of the second connection lines 204 through the fourth transfer line 208. In some embodiments, as shown in FIG. 20, to facilitate the electrical connection between the third transfer lines 207 and the fourth transfer line 208, the third transfer lines 207 may be gathered together before being connected to the fourth transfer line 208. Apparently, in other embodiments, each third transfer line 207 may also be electrically connected to the fourth transfer line 208 independently, which is not limited herein.

Figure 19:
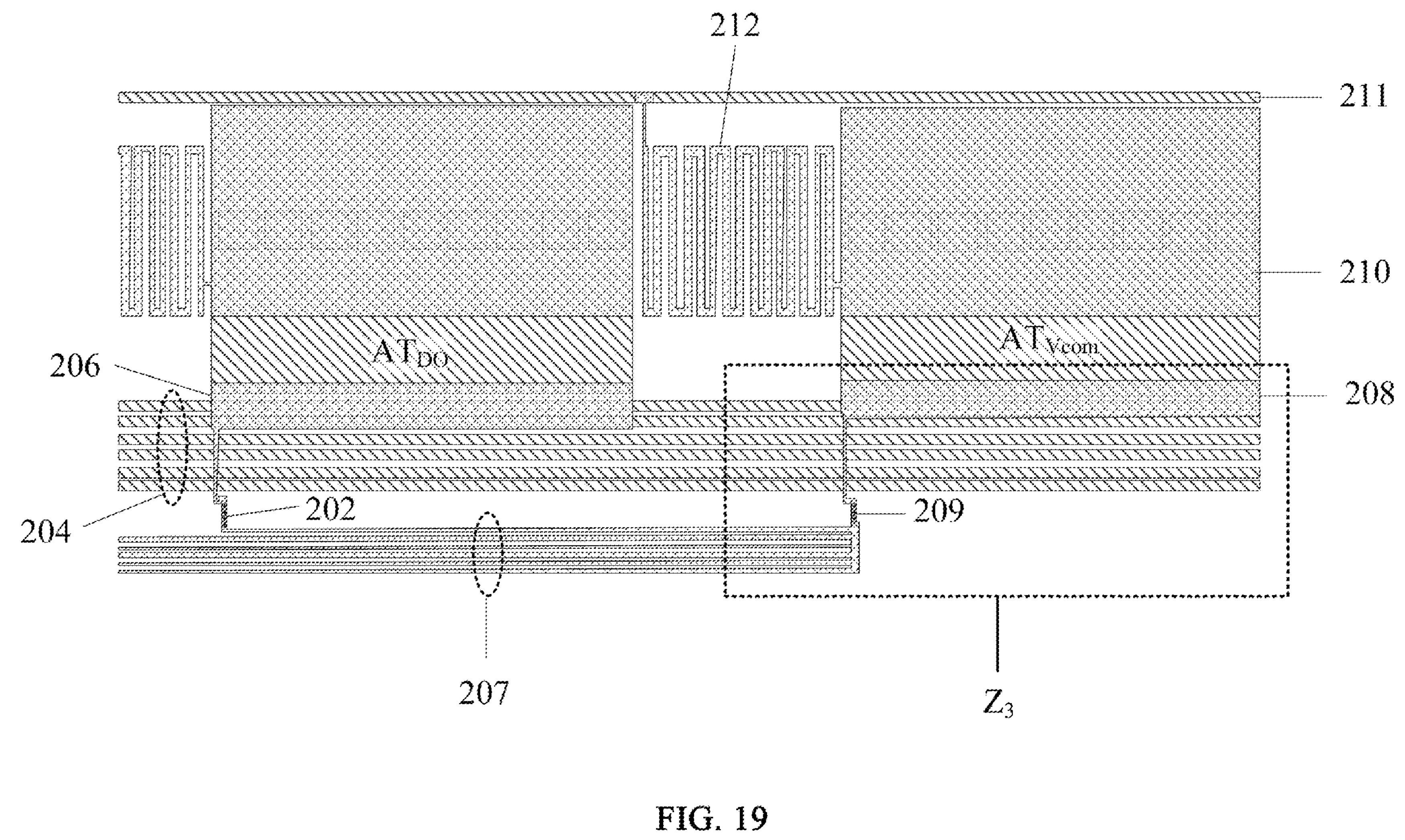
FIG. 19 is an enlarged schematic diagram of region $Z_2$ in FIG. 18.
Figure 21:
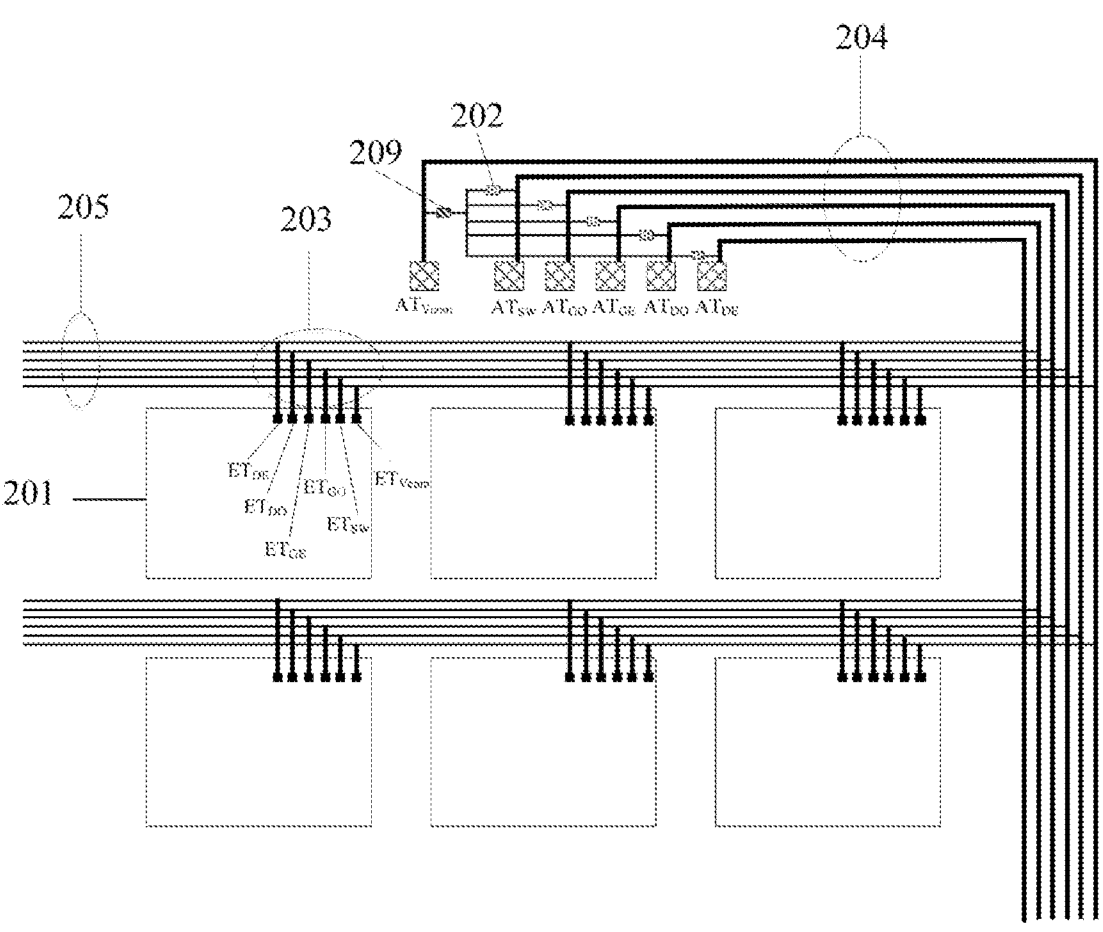
FIG. 21 is another schematic structural diagram of an intermediate substrate according to an embodiment of the present disclosure.
Figure 22:
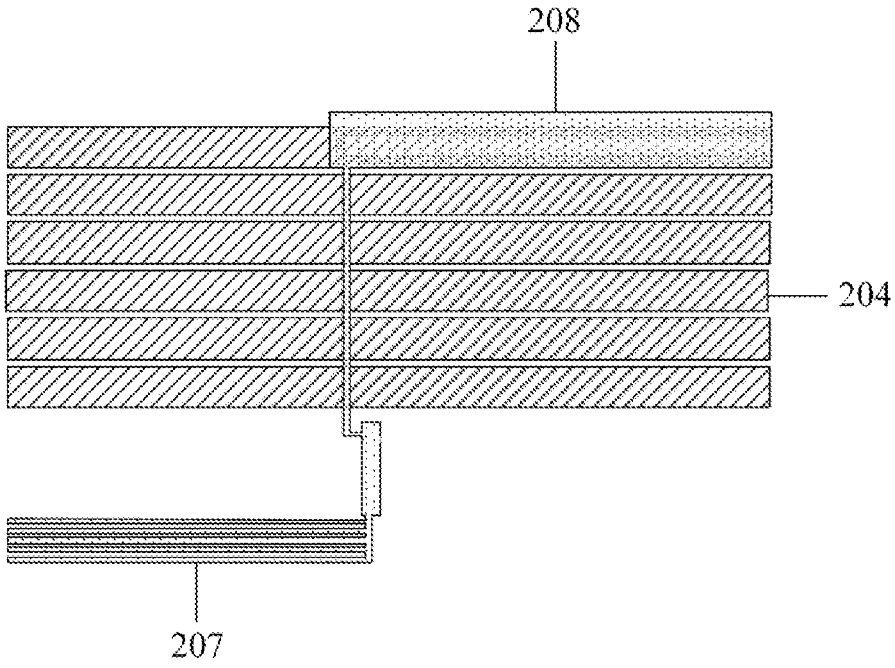
FIG. 22 is a schematic connection diagram of a second connection line, a third connection line, and a fourth transfer line according to an embodiment of the present disclosure.

In some embodiments, as shown in FIGS. 19 to 21, the intermediate substrate provided in the embodiments of the present disclosure may further include a fourth electrostatic ring 209 electrically connected between the third transfer lines 207 and the fourth transfer line 208; or, as shown in FIG. 22, the third transfer lines 207 may be integrally formed with the fourth transfer line 208 (that is, the third transfer lines 207 and the fourth transfer line 208 may be of a one-piece structure). By providing the fourth electrostatic ring 209, mutual influence between different test terminals (e.g., $AT_{GO}$, $AT_{GE}$, $AT_{DO}$, $AT_{DE}$, $AT_{SW}$ and $ATV_{com}$) can be avoided, and thus the test accuracy is increased. Optionally, the fourth electrostatic ring 209 has the same structure as the first electrostatic ring 102. In this manner, the fourth electrostatic ring 209 and the first electrostatic ring 102 can be prepared with the same process parameters, thereby simplifying the manufacturing process of the electrostatic rings. In addition, since the first electrostatic ring 102 is easily to be turned on under an influence of ESD, the fourth electrostatic ring 209 having the same structure as the first electrostatic ring 102 is also easily to be turned on under an influence of ESD, thereby facilitating ESD dispersion and improving the antistatic capability of the product.

In some embodiments, in the intermediate substrate provided in the embodiments of the present disclosure, the first transfer lines 205, the second transfer lines 206, the third transfer lines 207, and the fourth transfer line 208 are all disposed in the same layer and made of the same material as the pixel electrode 108, so that the first transfer lines 205, the second transfer lines 206, the third transfer lines 207, and the fourth transfer line 208 are formed at the same time when the pixel electrode 108 is patterned, thereby avoiding additional film layers and patterning processes for the first transfer lines 205, the second transfer lines 206, the third transfer lines 207, and the fourth transfer line 208.

In some embodiments, as shown in FIGS. 15 and 16, the intermediate substrate provided in the embodiments of the present disclosure may further include a plurality of second transfer terminals 210 electrically connected to the plurality of test terminals (e.g., $AT_{GO}$, $AT_{GE}$, $AT_{DO}$, $AT_{DE}$, $AT_{SW}$ and $ATV_{com}$), respectively, to facilitate to load signals on the test terminals (e.g., $AT_{GO}$, $AT_{GE}$, $AT_{DO}$, $AT_{DE}$, $AT_{SW}$, and $ATV_{com}$) through the second transfer terminals 210 in electrical tests. Optionally, the plurality of second transfer terminals 210 and the pixel electrode 108 are disposed in the same layer and made of the same material, so that the second transfer terminals 210 are formed at the same time when the pixel electrode 108 is patterned, thereby avoiding additional film layer and patterning process for the second transfer terminals 210. In some embodiments, in an arrangement direction of the test terminals (e.g., $AT_{GO}$, $AT_{GE}$, $AT_{DO}$, $AT_{DE}$, $AT_{SW}$ and $ATV_{com}$), the second transfer terminals 210 have a size equal to the test terminals (e.g., $AT_{GO}$, $AT_{GE}$, $AT_{DO}$, $AT_{DE}$, $AT_{SW}$ and $ATV_{com}$); and in a direction perpendicular to the arrangement direction of the test terminals (e.g., $AT_{GO}$, $AT_{GE}$, $AT_{DO}$, $AT_{DE}$, $AT_{SW}$ and $ATV_{com}$), the second transfer terminals 210 have a size smaller than the test terminals (e.g., $AT_{GO}$, $AT_{GE}$, $AT_{DO}$, $AT_{DE}$, $AT_{SW}$ and $ATV_{com}$). For example, in the direction perpendicular to the arrangement direction of the test terminals (e.g., $AT_{GO}$, $AT_{GE}$, $AT_{DO}$, $AT_{DE}$, $AT_{SW}$ and $ATV_{com}$), a ratio of a size of the second transfer terminals 210 to a size of each of the test terminals (e.g., $AT_{GO}$, $AT_{GE}$, $AT_{DO}$, $AT_{DE}$, $AT_{SW}$ and $ATV_{com}$) is greater than or equal to ½ and smaller than or equal to ⅔.

In some embodiments, as shown in FIGS. 18 and 19, the intermediate substrate provided in the embodiments of the present disclosure may further include a shorting bar 211 and a plurality of high resistance lines 212. The high resistance lines 212 are located between the second transfer terminals 210, each of the high resistance lines 212 is integrally formed with one of the second transfer terminals 210, each of the test terminals (e.g., $AT_{GO}$, $AT_{GE}$, $AT_{DO}$, $AT_{DE}$, $AT_{SW}$ and $ATV_{com}$) is electrically connected to the shorting bar 211 via one of the high resistance lines 212, and the shorting bar 211 is arranged in floating. In this manner, mutual interference of signals between different test terminals (e.g., $AT_{GO}$, $AT_{GE}$, $AT_{DO}$, $AT_{DE}$, $AT_{SW}$ and $ATV_{com}$) in electrical tests is avoided. Optionally, each high resistance line 212 may be a bending line spliced from a plurality of "U" shaped line segments.

Based on the same inventive concept, an embodiment of the present disclosure provides a method for manufacturing a display substrate. This method is used to solve the problem in a principle similar to that of the intermediate substrate and the display substrate, and therefore, the implementation of the method may refer to the implementations of the intermediate substrate and the display substrate described above, and repeated descriptions are omitted here.

In some embodiments, the method for manufacturing a display substrate provided in the embodiments of the present disclosure may include:

providing an intermediate substrate according to any one of the above embodiments of the present disclosure; and cutting the intermediate substrate to obtain the display substrate. The display substrate includes a base substrate including a display region and a bezel region on at least one side of the display region, the bezel region is provided with a plurality of test sub-terminals and a plurality of first electrostatic rings, the plurality of test sub-terminals include a common voltage test sub-terminal and a plurality of non-common voltage test sub-terminals, and the plurality of non-common voltage test sub-terminals are arranged in series and/or grounded via the first electrostatic rings.

Based on the same inventive concept, an embodiment of the present disclosure provides an electronic paper display apparatus, including a display substrate and an opposite substrate disposed opposite to each other, and an electrophoretic layer (FPL, Front Plane Laminate) between the display substrate and the opposite substrate, where the display substrate is the display substrate provided in any one of the above embodiments of the present disclosure. Optionally, the opposite substrate includes a common electrode in a planar structure, the common electrode is electrically connected to the common electrode line $V_{com}$ in the bezel region BB, and the common electrode may be made of a material including indium tin oxide (ITO), indium zinc oxide (IZO), or the like. The electrophoretic layer includes a plurality of electrophoretic particles, each of which may include a particle body, and an electrophoretic fluid and charged particles in the particle body. The charged particles may include black particles and white particles, or the charged particles may include black particles, white particles, and colored particles (e.g., red particles, yellow particles, blue particles, etc.). An electric field formed by the pixel electrode and the common electrode controls upward and downward movements of black particles and white particles, or black particles, white particles and colored particles (such as red particles, yellow particles and blue particles) with different charges, to display a black and white screen, or a colored screen of, for example, black, white and red, black, white and yellow, black, white and blue, or the like.

In some embodiments, the electronic paper product provided in the embodiments of the present disclosure may include, but is not limited to, a radio frequency unit, a network module, an audio output & input unit, a sensor, a display unit, a user input unit, an interface unit, a control chip, and the like. Optionally, the control chip is a central processing unit, a digital signal processor, a system on chip (SoC), or the like. For example, the control chip may further include a memory, a power module, or the like, and power supply and signal input/output functions are realized through additionally wires, signal lines, and the like. For example, the control chip may further include a hardware circuit, a computer-executable code, or the like. The hardware circuit may include a conventional very large scale integrated (VLSI) circuit or a gate array, or an existing semiconductor such as a logic chip, a transistor, or any other discrete component. The hardware circuit may further include a field-programmable gate array, a programmable array logic, a programmable logic device, or the like. Further, it may be understood by those skilled in the art that the above-described structures do not constitute any limitation to the display apparatus provided in the embodiments of the present disclosure. In other words, the electronic paper provided in the embodiments of the present disclosure may include more or less components than those described above, or some components may be combined, or arranged differently.

In summary, according to the display substrate, the manufacturing method thereof, the intermediate substrate and the electronic paper display apparatus provided in the embodiments of the present disclosure, on the display substrate of the present disclosure, the non-common voltage test sub-terminals (e.g., $ET_{DE}$, $ET_{DO}$, $ET_{GE}$, $ET_{GO}$ and $ET_{SW}$) are arranged in series and/or grounded through the first electrostatic ring 102, so that when excessive static electricity is accumulated on the non-common voltage test sub-terminals (e.g., $ET_{DE}$, $ET_{DO}$, $ET_{GE}$, $ET_{GO}$ and $ET_{SW}$), the first electrostatic ring 102 is turned on under an electrostatic high voltage action, and a path is formed between the non-common voltage test sub-terminals (e.g., $ET_{DE}$, $ET_{DO}$, $ET_{GE}$, $ET_{GO}$ and $ET_{SW}$), thereby increasing the ESD transmission paths, effectively dispersing the ESD, reducing the adverse effect of ESD on the test transistor electrically connected to the non-common voltage test sub-terminal $ET_{SW}$, and improving the antistatic capability of the product. By providing the second electrostatic ring 104 between the common voltage test sub-terminal $ETV_{com}$ and an adjacent non-common voltage test sub-terminal (for example, any one of $ET_{DE}$, $ET_{DO}$, $ET_{GE}$, $ET_{GO}$ or $ET_{SW}$), in the case of excessive static electricity accumulated on the common voltage test sub-terminal $ETV_{com}$ and the adjacent non-common voltage test sub-terminal (e.g., any one of $ET_{DE}$, $ET_{DO}$, $ET_{GE}$, $ET_{GO}$ or $ET_{SW}$), the second electrostatic ring 104 is turned on under an electrostatic high voltage action, thereby increasing electrostatic discharge paths and further reducing an influence of ESD on the test transistor. Further, with the channel width-to-length ratio of the transistors in the second electrostatic ring 104 being smaller than the channel width-to-length ratio of the transistors in the first electrostatic ring 102, the transistors in the second electrostatic ring 104 may have a smaller leakage current, thereby minimizing the influence of the second electrostatic ring 104 on the common voltage obtained by IC sensing.

In addition, by providing the third electrostatic ring 202 between the common voltage test terminal $ATV_{com}$ and the non-common voltage test terminal (e.g., $AT_{GO}$, $AT_{GE}$, $AT_{DO}$, $AT_{DE}$ or $AT_{SW}$) of the intermediate substrate, the third electrostatic ring 202 is turned on under an electrostatic high voltage action, so that the non-common voltage test terminal (e.g. $AT_{GO}$, $AT_{GE}$, $AT_{DO}$, $AT_{DE}$ or $AT_{SW}$), the first electrostatic ring 102, the common voltage test terminal $ATV_{com}$, the common voltage test sub-terminal $ETV_{com}$, and the common voltage line $V_{com}$ are sequentially electrically connected to each other and form a path through which the static electricity can be discharged to the common voltage line $V_{com}$ with a larger area, thereby dispersing the influence of ESD and preventing abnormal turn-on of the test transistor due to an action of the ESD from affecting the display effect. Moreover, after the intermediate substrate is cut into a display substrate 201 of a target size, since the common voltage test terminal $ATV_{com}$, the non-common voltage test terminal (e.g., $AT_{GO}$, $AT_{GE}$, $AT_{DO}$, $AT_{DE}$ or $AT_{SW}$) and the third electrostatic ring 202 therebetween are all cut off, the common voltage obtained by IC sensing will not affected by electric leakage of the third electrostatic ring 202 in the process, thereby obtaining an accurate common voltage.

Although the present disclosure has described preferred embodiments, it should be understood that those skilled in the art may make various changes and variations to the embodiments of the present disclosure without departing from the spirit and scope of the embodiments of the present disclosure. Therefore, if such modifications and variations to the embodiments of the present disclosure are within the scope of the claims of the present disclosure and their equivalents, the present disclosure is also intended to encompass such modifications and variations.

What is claimed is:

1. A display substrate, comprising:

a base substrate comprising a display region and a bezel region on at least one side of the display region;

a plurality of test sub-terminals in the bezel region, comprising a common voltage test sub-terminal and a plurality of non-common voltage test sub-terminals; and a first electrostatic ring in the bezel region, through which the plurality of non-common voltage test sub-terminals are arranged in series and/or grounded, wherein the first electrostatic ring comprises a first connection end and a second connection end; the first electrostatic ring comprises four transistors, wherein a gate of a first transistor, a first electrode of the first transistor, and a first electrode of a second transistor are electrically connected together to serve as the first connection end; a second electrode of the first transistor, a second electrode of the second transistor, a gate of the second transistor, a gate of a third transistor, a first electrode of the third transistor, and a first electrode of a fourth transistor are electrically connected together; a gate of the fourth transistor, a second electrode of the fourth transistor, and a second electrode of the third transistor are electrically connected together to serve as the second connection end.

2. The display substrate according to claim 1, wherein the first electrostatic ring is electrically connected between two adjacent ones of the plurality of non-common voltage test sub-terminals.

3. The display substrate according to claim 1, further comprising a second electrostatic ring electrically connected between the common voltage test sub-terminal and one of the plurality of non-common voltage test sub-terminals adjacent to the common voltage test sub-terminal; wherein the second electrostatic ring and the first electrostatic ring each comprise a plurality of transistors electrically connected to each other, and a transistor in the second electrostatic ring has a channel width-to-length ratio smaller than a transistor in the first electrostatic ring.

4. The display substrate according to claim 1, further comprising a transfer electrode above a layer where the first electrostatic ring is located, wherein the transfer electrode is electrically connected to the second electrode of the first transistor, the second electrode of the second transistor, the gate of the second transistor, the gate of the third transistor, the first electrode of the third transistor, and the first electrode of the fourth transistor.

5. The display substrate according to claim 4, further comprising a pixel electrode above a layer where the first electrostatic ring is located, wherein the transfer electrode and the pixel electrode are in the same layer and made of the same material.

6. The display substrate according to claim 1, further comprising a plurality of first transfer terminals, each of which is electrically connected to one of the test sub-terminals.

7. The display substrate according to claim 6, wherein the first electrostatic ring is electrically connected to the non-common voltage test sub-terminals through the first transfer terminals.

8. The display substrate according to claim 1, further comprising a ground line in the bezel region, wherein each of the non-common voltage test sub-terminals is electrically connected to the ground line through the first electrostatic ring.

9. An intermediate substrate, comprising a plurality of display substrates each being the display substrate according to claim 1, wherein the intermediate substrate further comprises a plurality of test terminals and a third electrostatic ring on a side of a region where the plurality of display substrates are located, wherein the plurality of test terminals comprise a common voltage test terminal and a non-common voltage test terminal, the common voltage test terminal is electrically connected to the common voltage test sub-terminal, the non-common voltage test terminal is electrically connected to one of the non-common voltage test sub-terminals, and the third electrostatic ring is electrically connected between the common voltage test terminal and the non-common voltage test terminal.

10. The intermediate substrate according to claim 9, wherein a number of non-common voltage test terminal is more than one, and at least two of the non-common voltage test sub-terminals are connected to the common voltage test terminal through the third electrostatic ring.

11. The intermediate substrate according to claim 9, wherein the plurality of test terminals and the plurality of test sub-terminals are each in the same layer and made of the same material as gates of the plurality of transistors.

12. The intermediate substrate according to claim 11, further comprising a plurality of first connection lines, a plurality of second connection lines, and a plurality of first transfer lines, wherein the plurality of first connection lines and the plurality of second connection lines are in the same layer and made of the same material, and the plurality of first connection lines are in a layer different from a layer where the plurality of first transfer lines are located; and each of the first connection lines is electrically connected to a corresponding one of the test sub-terminals through one of the first transfer terminals, each of the second connection lines is electrically connected to one of the test terminals, and each of the first transfer lines is electrically connected between one of the first connection lines and one of the second connection lines.

13. The intermediate substrate according to claim 12, further comprising a plurality of second transfer lines, a plurality of third transfer lines, and one fourth transfer line, wherein each of the non-common voltage test terminals is electrically connected to a corresponding one of the second connection lines through one of the second transfer lines, each of the second transfer lines is electrically connected to one of the third transfer lines through the third electrostatic ring, the plurality of third transfer lines are electrically connected to the fourth transfer line, and the common voltage test terminal is electrically connected to a corresponding one of the second connection lines through the fourth transfer line.

14. The intermediate substrate according to claim 13, wherein the plurality of third transfer lines are integrally formed with the fourth transfer line, or the intermediate substrate further comprises a fourth electrostatic ring, through which the plurality of third transfer lines are electrically connected to the fourth transfer line.

15. The intermediate substrate according to claim 14, wherein each of the third electrostatic ring and the fourth electrostatic ring has the same structure as the first electrostatic ring.

16. The intermediate substrate according to claim 9, further comprising a plurality of second transfer terminals, wherein each of the second transfer terminals is electrically connected to a corresponding one of the test terminals.

17. The intermediate substrate according to claim 16, further comprising a shorting bar and a plurality of high resistance lines, wherein the high resistance lines are located between the second transfer terminals, each of the high resistance lines is integrally formed with one of the second transfer terminals, each of the test terminals is electrically connected to the shorting bar via one of the high resistance lines, and the shorting bar is in floating.

18. An electronic paper display apparatus, comprising a display substrate and an opposite substrate opposite to each other, and an electrophoretic layer between the display substrate and the opposite substrate; wherein the display substrate is the display substrate according to claim 1.

* * * * *